United States Patent
Sandu

(10) Patent No.: US 7,569,241 B2
(45) Date of Patent: *Aug. 4, 2009

(54) MAGNETIC ALIGNMENT SYSTEM FOR SCRAPED-SURFACE HEAT EXCHANGER AND METHOD

(75) Inventor: Constantine Sandu, Tustin, CA (US)

(73) Assignee: ConAgra Foods RDM, Inc., Omaha, NE (US)

( * ) Notice: Subject to any disclaimer, the term of this patent is extended or adjusted under 35 U.S.C. 154(b) by 1219 days.

This patent is subject to a terminal disclaimer.

(21) Appl. No.: 10/717,115

(22) Filed: Nov. 19, 2003

(65) Prior Publication Data

US 2005/0103206 A1    May 19, 2005

(51) Int. Cl.
*G01M 1/18* (2006.01)
(52) U.S. Cl. .................... 426/231; 426/519; 99/337; 99/342; 73/462; 73/468
(58) Field of Classification Search ............. 426/231, 426/519; 99/325, 337, 342; 165/86–94, 165/200; 366/142; 33/193; 73/66, 460, 73/462, 468
See application file for complete search history.

(56) References Cited

U.S. PATENT DOCUMENTS

| 261,234 | A |   | 7/1882  | Jameson |
|---|---|---|---|---|
| 1,233,569 | A |   | 7/1917  | Graemiger |
| 1,847,006 | A |   | 2/1932  | Kalischer |
| 2,206,006 | A |   | 6/1940  | Hendrey |
| 2,514,116 | A | * | 7/1950  | Baker ................... 15/104.095 |
| 2,995,346 | A | * | 8/1961  | Samples ..................... 366/98 |
| 3,063,041 | A |   | 11/1962 | Quade et al. |
| 3,568,030 | A | * | 3/1971  | Faxon ....................... 318/696 |
| 3,839,085 | A | * | 10/1974 | Hulvey et al. ................. 134/8 |
| 4,279,295 | A |   | 7/1981  | Duckworth |
| 4,888,509 | A | * | 12/1989 | Tomasek ..................... 310/42 |
| 5,038,855 | A |   | 8/1991  | McLellan |
| 5,143,738 | A | * | 9/1992  | Nordin ....................... 426/231 |
| 5,224,835 | A | * | 7/1993  | Oltman ....................... 417/12 |
| 5,485,880 | A |   | 1/1996  | Zeuthen |
| 5,593,378 | A |   | 1/1997  | Dyck |
| 5,645,355 | A |   | 7/1997  | Tokushima et al. |

(Continued)

FOREIGN PATENT DOCUMENTS

JP    353025062 A    3/1978

(Continued)

OTHER PUBLICATIONS

International Application No. US02/27823 (Publication No. WO 03/021179 A1); Published Mar. 13, 2003; ConAgra Grocery Products Company; C. Sandhu et al.

*Primary Examiner*—Drew E Becker
(74) *Attorney, Agent, or Firm*—Merchant & Gould P.C.

(57) ABSTRACT

A magnetically aligned scraped-surface heat exchanger and method are provided. A stator includes electromagnetic elements, such as solenoids. A rotor, attached to a shaft of the heat exchanger, rotates within the stator. Sensors detect the position of the rotor, such as a radial or an axial position. The position data is provided to the control circuit. When the position of the rotor is to be re-aligned or adjusted, the control circuit activates or de-activates one or more of the solenoids of the stator to alter or complete a magnetic field through the rotor to re-align the rotor and the shaft attached thereto.

73 Claims, 24 Drawing Sheets

U.S. PATENT DOCUMENTS

| | | |
|---|---|---|
| 5,755,106 A | 5/1998 | Ross |
| 5,757,662 A * | 5/1998 | Dyer et al. ................... 700/279 |
| 5,823,261 A * | 10/1998 | Drumheller ............ 166/250.01 |
| 6,133,656 A * | 10/2000 | Hisey ........................ 310/68 C |
| 6,220,047 B1 | 4/2001 | Vogel et al. |
| 6,236,934 B1 * | 5/2001 | Dyer et al. ................... 701/124 |
| 6,438,987 B1 | 8/2002 | Pahl |
| 6,467,944 B2 | 10/2002 | Ugolini |
| 6,606,922 B2 * | 8/2003 | Case et al. ................... 464/180 |
| 6,675,877 B2 * | 1/2004 | Sandu et al. ................... 165/91 |
| 6,912,922 B2 * | 7/2005 | Cheshmehdoost et al. ................................................... 73/862.333 |
| 7,095,193 B2 * | 8/2006 | Kellogg et al. ......... 318/400.38 |
| 2003/0042007 A1 * | 3/2003 | Sandu et al. ................... 165/94 |
| 2006/0005623 A1 * | 1/2006 | Hildebrand et al. ........... 73/468 |

FOREIGN PATENT DOCUMENTS

| | | |
|---|---|---|
| RU | 247071 | 4/1969 |
| SU | 1160277 A * | 6/1985 |

* cited by examiner

MAGNETIC ALIGNMENT SYSTEM FOR SCRAPED-SURFACE HEAT EXCHANGER AND METHOD

FIELD OF THE INVENTION

The present invention is generally directed to heat exchangers for use in food processing, and, more particularly, to scraped-surface heat exchangers having components that can be aligned with magnetic bearings.

DESCRIPTION OF RELATED ART

Scraped-surface heat exchangers are commonly used in aseptic processing of foodstuffs, such as puddings, gels and other heat-processed food items. Heat exchangers provide the ability to process heat-sensitive, viscous, or particulate-laden products, enhance the heat transfer of viscous products, and minimize the extent of burn-on or fouling on the heat transfer surface.

One conventional heat exchanger includes a shaft that rotates within a heat transfer tube. Foodstuff passes through an annulus formed between the shaft and the tube. A heating or cooling medium flows through a jacket around the tube, while insulation surrounds the jacket to reduce heat loss. The rotating shaft carries blades that scrape food product film from an interior surface of the heat transfer tube. The "cleaned" wall enhances heat transfer and processing of the food product.

A typical heat exchanger includes rotary mechanical seals between the interior and exterior of the heat exchanger at the ends of the rotating shaft. Typical mechanical seal faces include a hardened surface, such as silicon carbide, tungsten carbide or chromium oxide, that rotate against a softer surface, such as a graphite compound. The rotary mechanical seals are used to maintain the pressure inside the scraped-surface heat exchanger, and to prevent leaks and contamination in aseptic processing. For these reasons, a barrier fluid that meets purity and safety standards, such as culinary steam and chlorinated water, floods the rotary mechanical seals.

Conventional heat exchanger configurations, however, can be improved. For example, under operating conditions associated with aseptic processing, a rotary mechanical seal presents a number of inconveniences and shortcomings. First, the mechanical seal can fail if it is not regularly maintained. A broken seal can cause leakage and possible contamination of the food product in the heat exchanger. Second, heat exchanger components that contact food product should be easily removable for inspection and maintenance. Some conventional systems require significant disassembly of the exchanger to perform cleaning and maintenance. Third, the shaft should be easily and accurately aligned so that the scraper blades attached thereto can evenly scrape the interior exchanger surfaces to increase the efficiency of the heat exchanger and to produce a higher quality product.

A need, therefore, exists for a scraped-surface heat exchanger that can be aligned during operation, provides high levels of product throughput, produces safe foodstuffs for consumers, and eliminates rotary mechanical seals at the ends of the rotating shaft.

SUMMARY OF THE INVENTION

In accordance with one embodiment, a magnetic alignment apparatus for aligning a shaft of a scraped-surface heat exchanger includes a stator, a rotor, a sensor, and a control circuit. The stator includes electromagnetic elements. The rotor is attached to the shaft and rotates within the stator. Food product flows through a cavity of the rotor. The sensor detects the rotor position, and the control circuit monitors the rotor position with the sensor data. One or more electromagnetic elements are activated or de-activated to adjust the rotor position.

In accordance with another embodiment, a magnetic alignment apparatus for a scraped-surface heat exchanger includes a stator and a rotor. The stator includes a plurality of solenoids, and the rotor rotates between the solenoids. The rotor has an outer surface that can be magnetized so that when a solenoid is activated, the rotor is dynamically aligned using a magnetic field through the stator and the rotor.

In accordance with another embodiment, a method of magnetically aligning a shaft of a scraped-surface heat exchanger includes detecting a position of a rotor attached to the shaft, comparing a detected position of the rotor to a predetermined range of positions, and if the detected position falls outside the predetermined range, adjusting the position of the rotor by activating or de-activating one or more solenoids in the stator so that a magnetic field through the solenoids and the rotor changes the position of the rotor.

In accordance with an additional embodiment is method of aligning a shaft of a scraped-surface heat exchanger while processing a food product. The method includes providing a food product within the rotor, rotating the rotor within a stator using a motor, detecting a rotor position, comparing the detected position to a predetermined range of positions, and if the detected position does fall outside the predetermined range, adjusting the rotor position by activating or de-activating one or more solenoids in the stator so that a magnetic field completed through the activated solenoid and the rotor changes the rotor position.

In apparatus and method embodiments, a pair or other numbers of adjacent or non-adjacent electromagnetic elements, such as solenoids, can be periodically or non-periodically activated or de-activated to change the rotor of non-drive and drive ends. For example, the rotor position can be changed by de-activating a solenoid and using the resulting diminished or reduced magnetic field. As a further example, the rotor position can be adjusted by activating a solenoid and using the resulting magnetic field formed or completed through the stator and the rotor.

The stator and the rotor can have generally cylindrical or conical complimentary shapes. Further, the rotor can be magnetized with different polarities and be permanently or temporarily magnetized. The rotor includes an end member, a first annular member, a second annular member, and optionally a third annular member. Food product can exit the rotor through an aperture defined between the end member and the first annular member, between an aperture defined between the first and second annular members, and between an aperture defined by the second and third annular members.

In apparatus and method embodiments, when the rotor is at rest, it can rest on one or more support bearings. A sensor is inserted into the support bearing. A generally cylindrical member or can surrounds a portion of the rotor. Food product passes between an inner surface of the cylindrical member and an exterior surface of the portion of the rotor. A support member can be attached to an end of a rotor to provide axial support. The support member includes a fixed outer support, a rotatable inner member that is attached to the end of the rotor, and a rotatable cage between the fixed outer support and the rotatable inner member. Housings formed in the cage hold bearings.

BRIEF DESCRIPTION OF THE DRAWINGS

Referring now to the drawings in which like reference numbers represent corresponding parts throughout.

DETAILED DESCRIPTION OF ILLUSTRATED EMBODIMENTS

In the following description, reference is made to the accompanying drawings which form a part hereof, and which show by way of illustration specific embodiments in which the embodiments may be practiced. It is to be understood that other embodiments may be utilized.

Embodiments of a dynamic alignment apparatus and method for a scraped-surface heat exchanger using magnetic alignment will now be described. Both the drive and non-drive ends of the exchanger can be radially and/or axially aligned using magnetic bearings. The alignment of the drive and non-drive ends can be monitored periodically or intermittently, and alignment adjustments can also occur at the timing intervals as needed to ensure that the scraper blades are properly aligned with interior heat exchanger surfaces. The present invention can be used with various commercially available heat exchangers, such as Votator®, Thermutator®, Contherm®, Schroeder and Terlotherm® heat exchangers. This specification refers to a scraped-surface heat exchanger for purposes of explanation and illustration, but not limitation.

Figure 1:
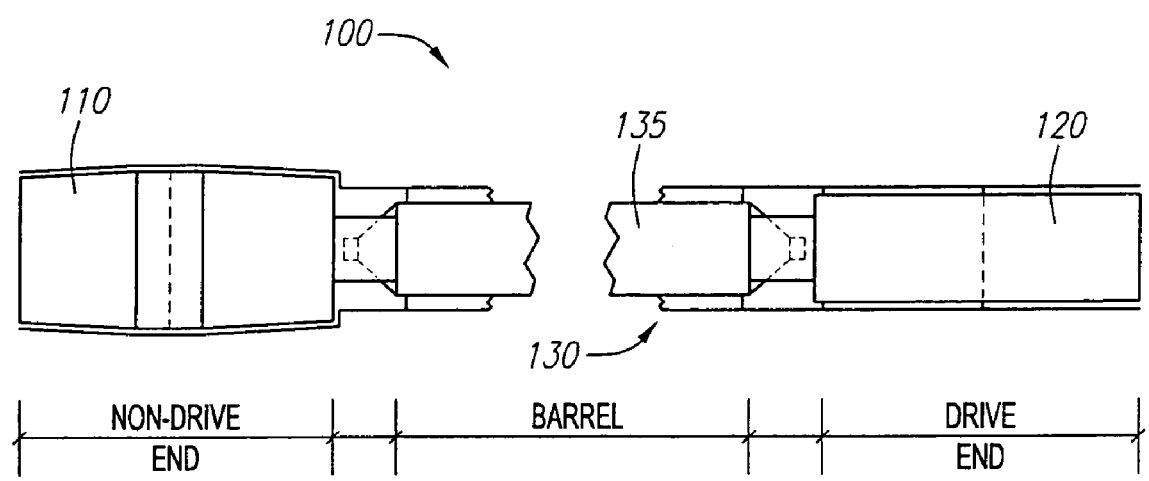
FIG. 1 generally illustrates heat exchanger components including a non-drive end, a drive or motor end, and a middle or barrel section with a shaft.

Referring to FIG. 1, in one embodiment, a magnetic alignment system 100 includes a magnetically aligned non-drive end 110, a magnetically aligned drive or motor end 120, and a barrel section 130 between the non-drive and drive ends. The barrel section 130 includes a shaft 135 that is driven by the drive end 120 and connected between the drive and non-drive ends. Both of the non-drive and drive ends 110 and 120 can be magnetically aligned in a radial direction. Further, one of the ends is axially aligned.

When describing magnetic alignment, this specification primarily refers to the non-drive end, however, similar principles, techniques, and components may be used to magnetically align the drive end. Accordingly, some details regarding the alignment components and methods are described with reference to the non-drive end, but are not repeated in sections related to the drive or motor end.

Figure 2:
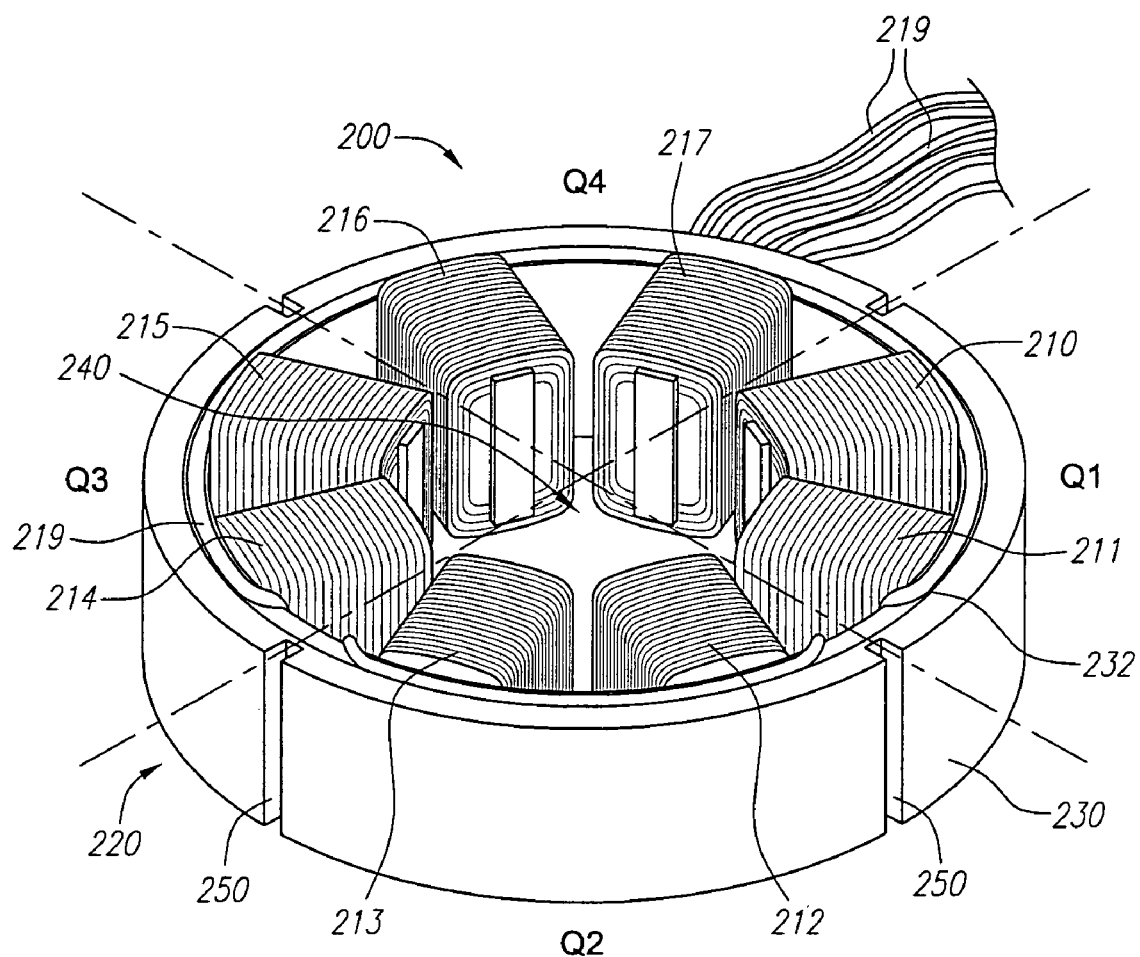
FIG. 2 is a perspective view of a stator.
Figure 3A:
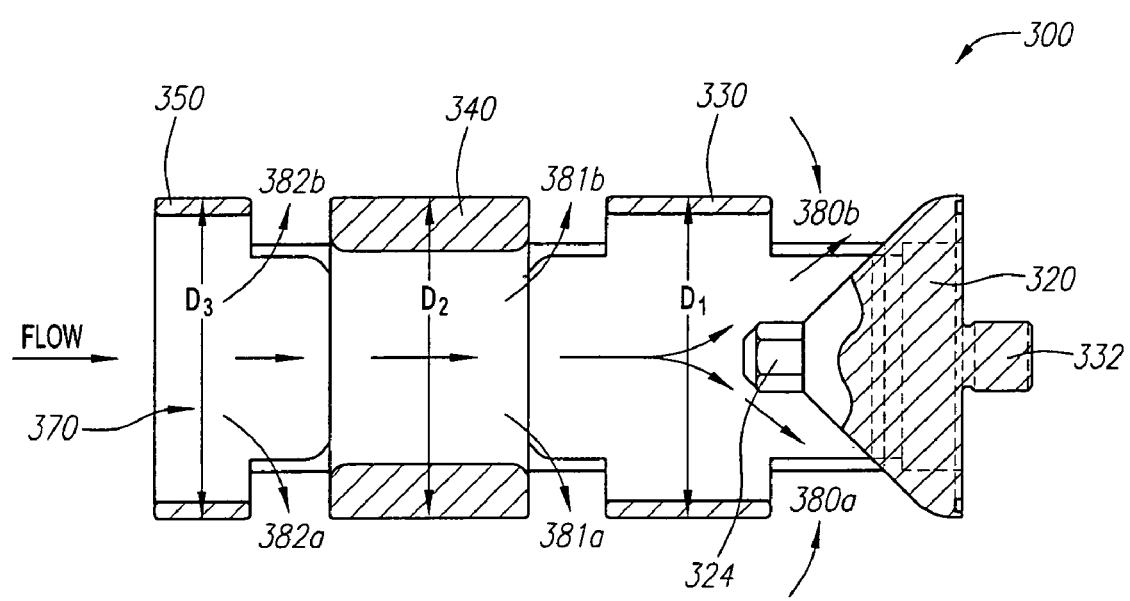
FIGS. 3A-B are separated cross-sectional and partial perspective views of a rotor.
Figure 3B:
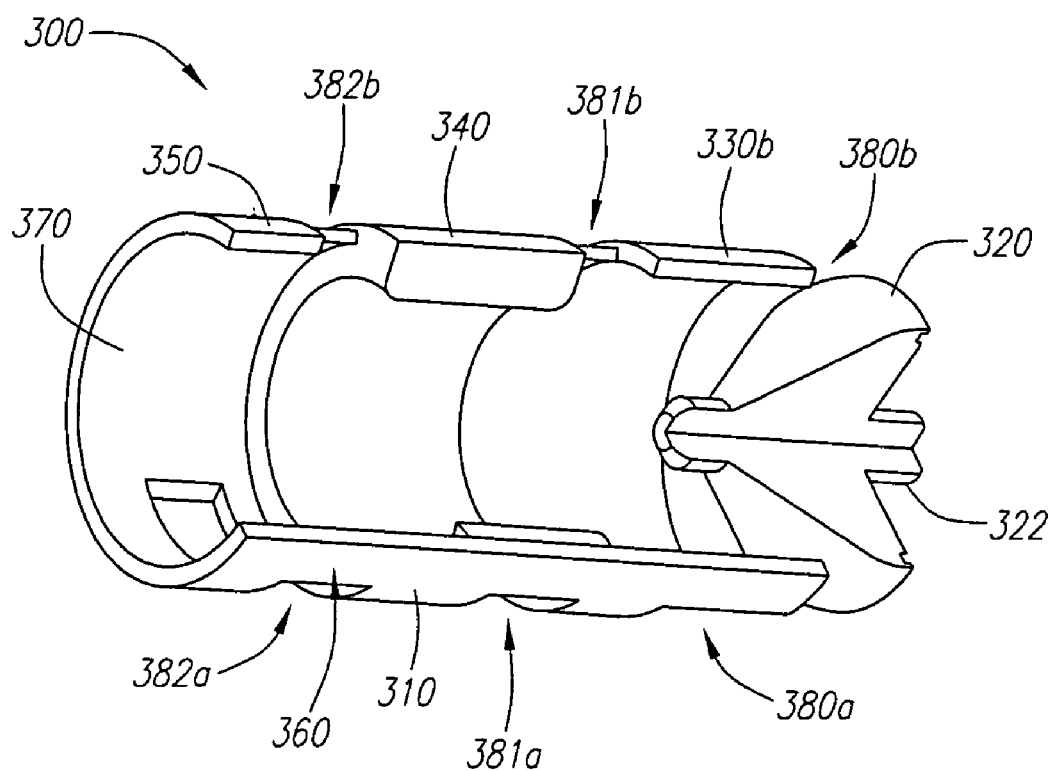

Referring to FIGS. 2, 3A and 3B, in one embodiment, a magnetic alignment system of the non-drive end 110 (and the drive end 120) includes a stator with solenoids, a rotor that rotates within the stator, auxiliary support members for supporting the rotor, one or more axial and/or radial sensors that detect the position or alignment of the rotor, and a control circuit that activates one or more solenoids to align the rotor and the attached heat exchanger shaft. The stator and rotor of the non-drive end 110 provide the ability to monitor and align the rotor, while also providing increased flow of food product through the rotor, to produce improved foodstuffs at faster production rates. Embodiments also preserve aseptic processing while eliminating mechanical rotary end seals.

Persons of ordinary skill in the art will recognize that changing the state of one or more solenoids, e.g., by activation or de-activation, can result in changing the position of a rotor. For example, the rotor position can be changed by de-activating a solenoid and using the resulting diminished or reduced magnetic field. As a further example, the rotor position can be adjusted by activating a solenoid and using the resulting or stronger magnetic field completed through the stator and the rotor. This specification, however, primarily refers to activating solenoids to adjust the rotor position for purposes of explanation and illustration, but the rotor can be changed by both activating and de-activating a solenoid.

In one embodiment, referring to FIG. 2, a stator 200 includes a plurality of electromagnetic members, such as solenoids 210-217 (generally 210). The stator 200 can have different numbers of solenoids 210, for example, eight solenoids, as shown in FIG. 2. Increasing the number of solenoids can increase alignment capabilities by providing radial alignment forces from more directions. In the embodiment shown having eight solenoids 210, the stator 200 and the solenoids 210 can be divided into quadrants ($Q_1$-$Q_4$) (for purposes of illustration), with a pair of solenoids 210 in each quadrant.

The solenoids 210 may be arranged against an inner surface 232 of an outer cylindrical body 230 to form a magnetic bearing 220. A rotor (shown in FIGS. 3A-B) rotates within a middle, inner aperture 240 in the stator 200 and between the ends of the solenoids 210. Wiring 219 or other connectors from the solenoids 210 may be placed between the outer ends of the solenoids 210 and the inner surface 232 and directed to a point where they meet and exit the stator 200 for connection to a controller (not shown). For example, as shown in FIG. 2, wiring 219 from solenoids 210-213 in quadrants $Q_1$ and $Q_2$ is wrapped around an inner half of the outer body 230, and wiring 219 from solenoids 214-217 in quadrants $Q_3$ and $Q_4$ is wrapped around the opposite inner half. The stator 200 may also include notches 250 for securing the stator 200 within a housing.

The outer body 230 and the solenoid 210 cores can include various magnetic materials that can be temporarily or permanently magnetized, for example, iron and other ferro-magnetic materials. In other words, in one embodiment, the body 230 is not a permanent magnet, but may temporarily magnetized in response to a magnet or a charge that approaches the body 230. In an alternative embodiment, the body 230 is a permanent magnet.

Referring to FIGS. 3A-B, in one embodiment, a rotor 300 is a generally cylindrical body 310 having a conical-shaped end member 320 and annular members 330-350. The conical end member 320 is connected to (e.g., threaded into) the rotating shaft 135. The body 310 includes a first annular member 330 proximate or adjacent to the conical end member 320, a second annular member 340 proximate or adjacent to the first annular member 330, and, optionally a third annular member 350 proximate or adjacent to the second annular member 340, as shown in FIGS. 3A-B.

The conical end member 320 and the annular members are joined together by one or more lateral segments 360 that extend across the rotor 300. The body 310 defines an inner cavity 370 that extends through the annular members. A mounting end 322 of the conical end member 320 is secured to the shaft 135 or a shaft connector (not shown in FIGS. 3A-B).

The rotor 300 defines one or more arcuate apertures through one or more sections of the rotor through which a food product can flow (e.g., as shown by flow arrows). For example, arcuate apertures 380a and 380b (generally 380) are formed between the conical end member 320 and the first annular member 330, arcuate apertures 381a and 381b (generally 381) are formed between the first and second annular members 330 and 340, and arcuate apertures 382a and 382b (generally 382) are formed between the second and third annular members 340 and 350. Different numbers of apertures can extend for different circumferential distances around the cylindrical rotor depending on the rotor configuration and desired food product throughput. For example, one, two, three, and other numbers of apertures can be utilized. For purposes of explanation and illustration, but not limitation, this specification refers to three arcuate apertures 380-382.

The annular members of the rotor 300 can have different diameters, widths, and thicknesses. For example, in the illustrated embodiment, the outer diameters D1, D2 and D3 are approximately the same. The rotor configuration, however, is not so limited and can be configured as needed. For example, persons of ordinary skill in the art will recognize that the annular members can be configured with different outer diameters for different rotor and stator configurations.

In use, a food product enters the inner cavity 370 through the third annular member 350. While the rotor 300 is rotating, the food product exits the rotor 300 and proceeds to the heat exchanger tube (not shown) in which the food product is scraped from the inner surface of the tube by scraper blades. The food product can exit through one or more of the apertures 380-382 to the heat exchanger tube. In one embodiment, a majority of the food product flows through the inner cavity 370 and exits the rotor 300 through the aperture 380 between the end cap 320 and the first annular member 330. The flow of food product may also be reversed.

Figure 4A:
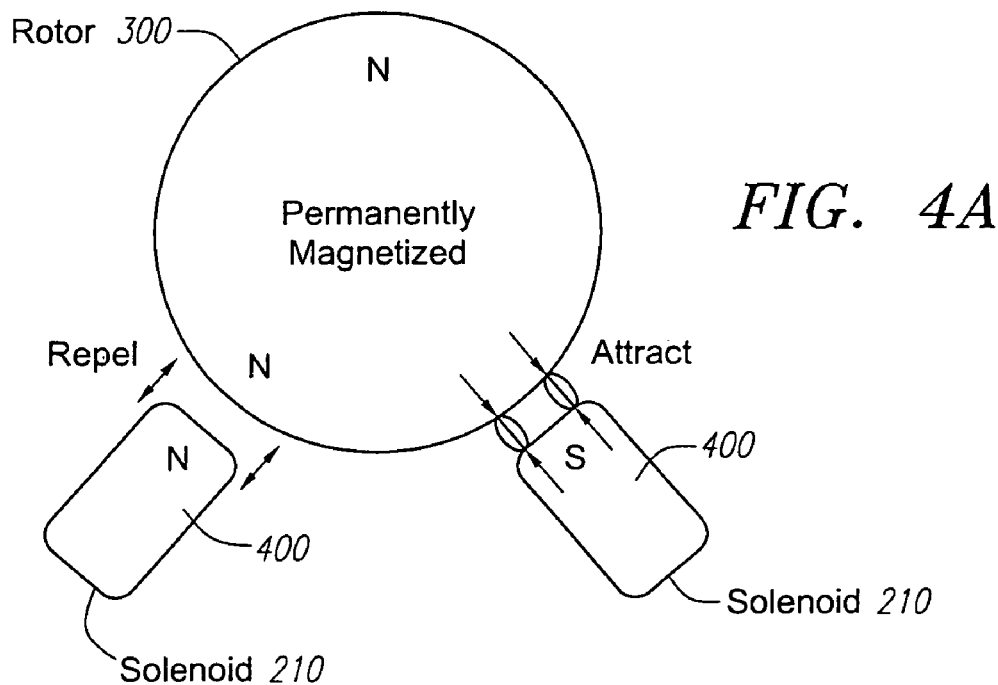
FIGS. 4A-B illustrate interactions between an activated solenoid and a rotor that is permanently magnetized.
Figure 4B:
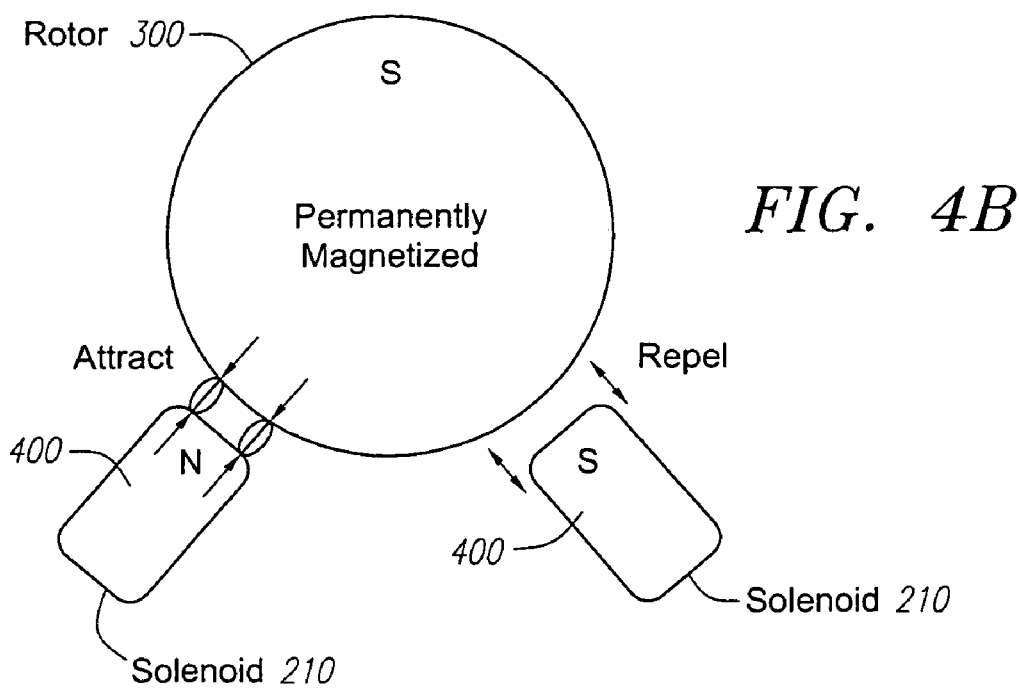

FIGS. 4A-B generally illustrate magnetic interactions that allow the drive and non-drive ends to be magnetically aligned. Referring to FIG. 4A, if a solenoid magnetization 400 is "North" and the rotor 300 is similarly magnetized permanent magnet, then the solenoid 210 and the rotor 300 repel each other. Conversely, if a solenoid magnetization 400 is "South," then the solenoid 400 and the rotor 300 are attracted to each other. Referring to FIG. 4B, if a solenoid magnetization 400 is North and the rotor 300 is a South magnetized permanent magnet, then the solenoid 210 and the rotor 300 are attracted to each other. Conversely, if the solenoid magnetization 400 is South, then the solenoid 210 and the rotor 300 repel each other.

Figure 4C:
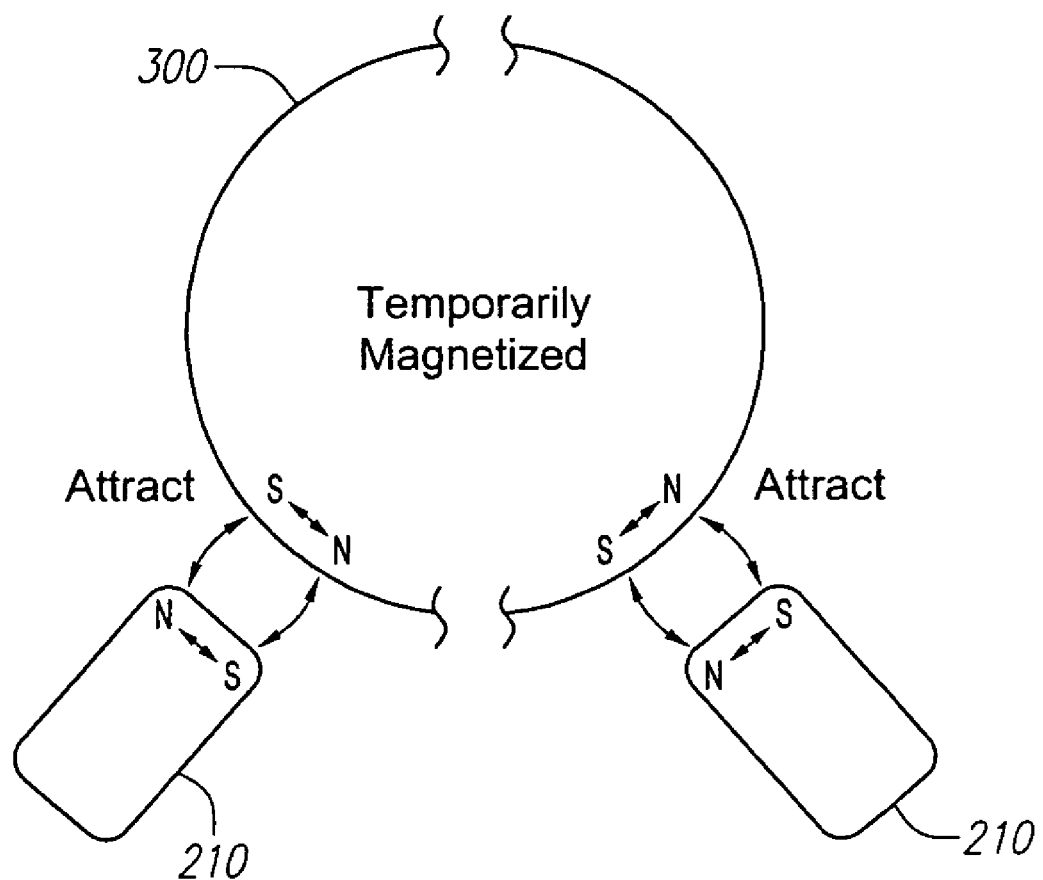
FIG. 4C illustrates interactions between an activated solenoid and a rotor enclosure that is temporarily magnetized.

FIG. 4C generally illustrates the interaction between a solenoid magnetization 400 and a rotor 300 that can be temporarily magnetized. In this configuration, the North and South solenoid ends are attracted to the rotor 300 since the rotor 300 is temporarily magnetized to be attracted to a magnet. For example, when a solenoid 210 is activated, it is believed that North and South poles are generated in the solenoid 210. The rotor 300, in turn, is also magnetized with North and South poles. As a result, a magnetic field is completed between the North and South poles of the solenoid 210 and the rotor 300, thereby resulting in an attraction between the rotor 300 and the activated solenoid 210.

Different numbers, groups and sequences of solenoids 210 can be activated to generate a magnetic field between the activated solenoids 210 and the rotor 300 to re-position the rotor by repulsion and attraction actions. For example, a pair of solenoids 210 can be activated. The apparatus can also be configured so that other numbers of solenoids are activated, e.g., one, three, or four solenoids. In addition, as an alternative to activating adjacent or "paired" or adjacent solenoids, various numbers of non-adjacent solenoids 210 can be activated. Further, different numbers of adjacent or non-adjacent solenoids 210 can be activated at different times, simultaneously, at periodic or intermittent intervals, and for various durations as needed. The previously described magnetic attraction and repulsion actions can move or adjust the rotor 300 and the shaft 135 attached thereto in various directions at different times. Having described a stator, a rotor, and a manner in which the rotor can be radially aligned using the stator, the manner in which these components are assembled together is now described.

Figure 5:
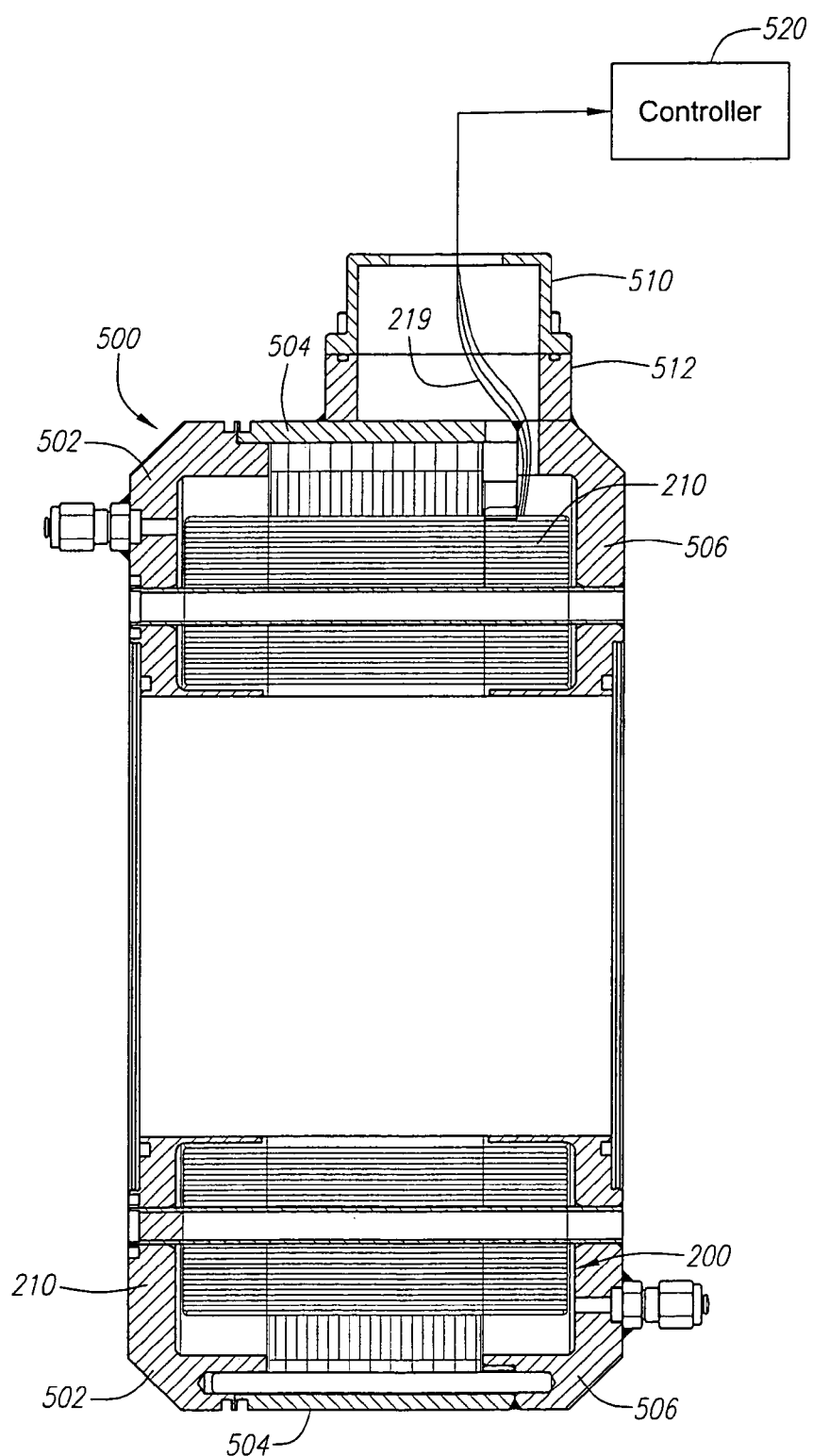
FIG. 5 is a cross-sectional view of a housing that surrounds a stator and part of a rotor.

Referring to FIG. 5, a stator 200 and a portion of a rotor 300 may be enclosed in a housing 500. One exemplary housing 500 includes a left housing section 502, a center housing section 504, and a right housing section 506. In one embodiment, the stator 200 is completely enclosed in the housing 500, and the second annular member 340 of the rotor 300 is contained within the housing 500. The housing 500 may also include a cap 510 between the top and right housing sections 502 and 506. Solenoid wires 219 are placed through a gap 512 formed between the middle and right housing sections 504 and 506 and through a cap outlet 510 for connection to a controller 520, such as a processor, micro-controller, or other control circuit.

Figure 6A:
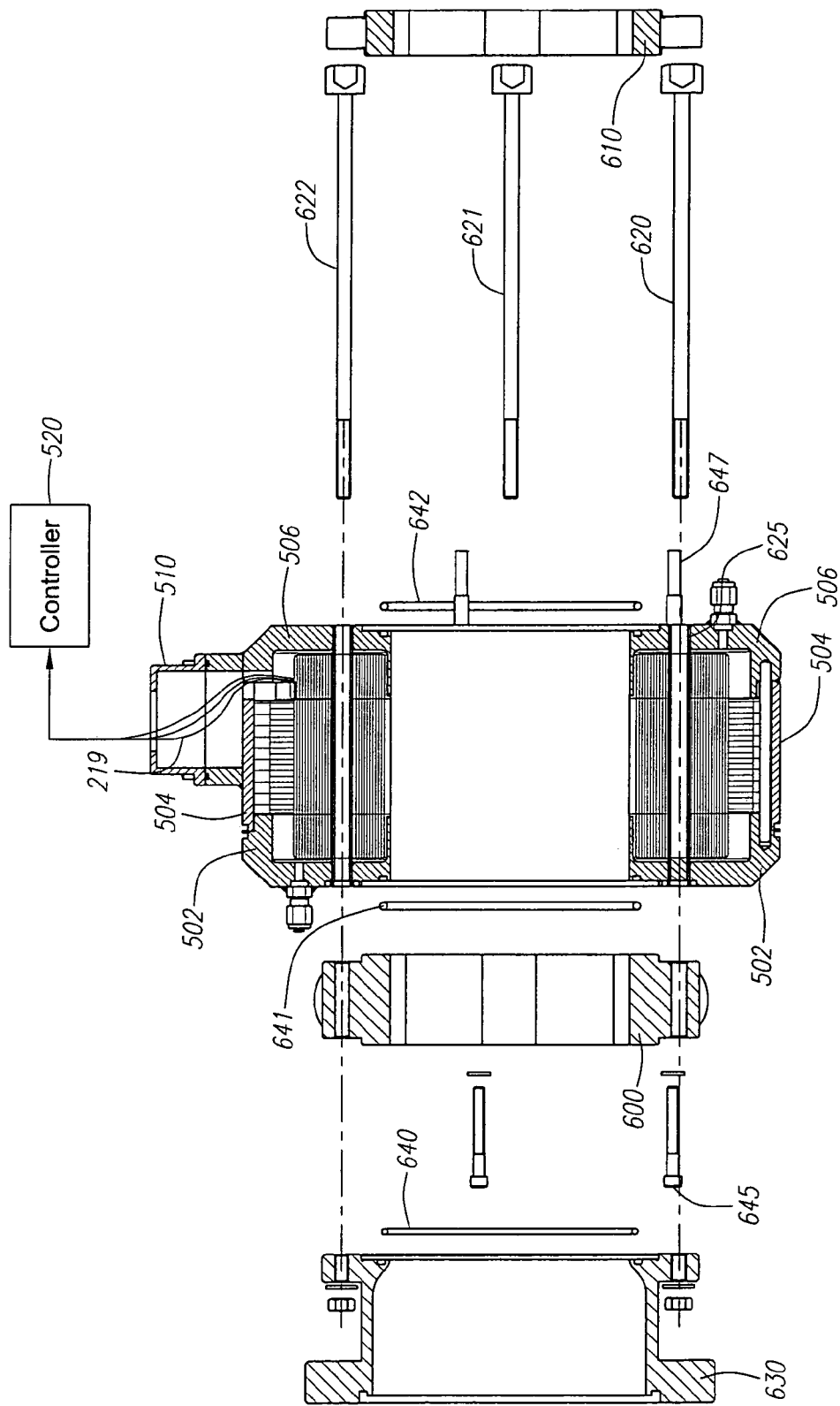
FIGS. 6A-C are different views of auxiliary bearings for supporting a rotor.
Figure 6B:
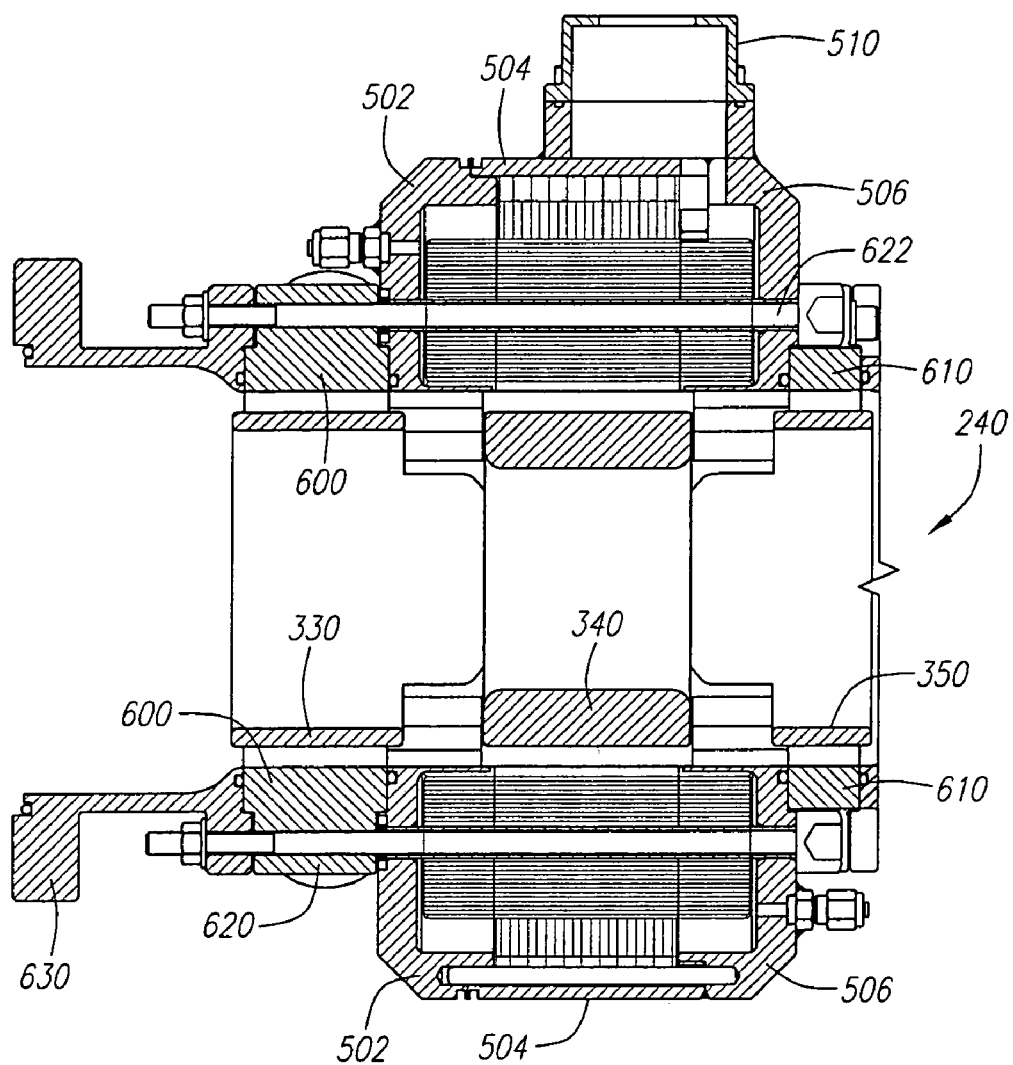
Figure 6C:
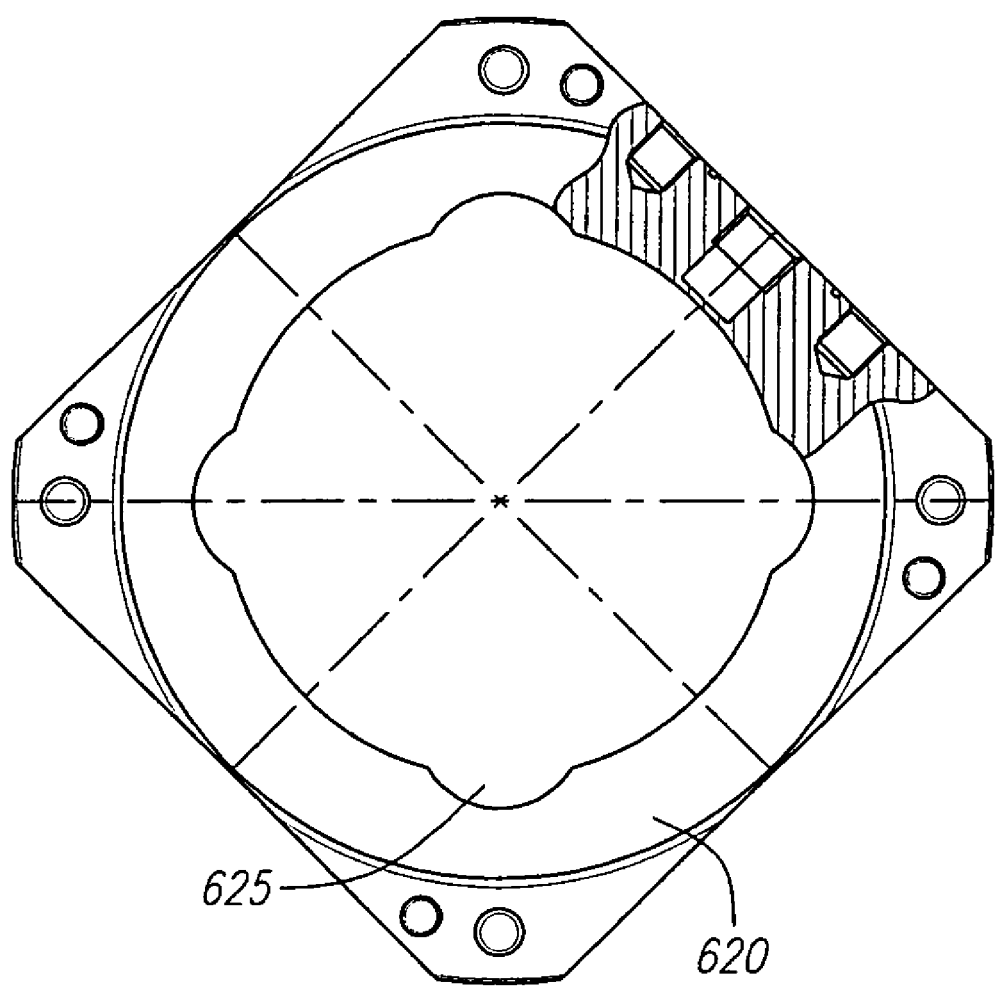

Referring to FIGS. 6A-C, auxiliary support members or bearings 600 and 610 support the rotor when it does not rotate, for example, when the rotor is at rest or without power. The auxiliary bearings 600 and 610 can be made of various non-conductive materials, such as polyetheretherketone (PEEK). PEEK is a mechanically strong plastic material that is also suited for bushing-like auxiliary bearings.

With the rotor 300 shown in FIG. 3, a first support bearing 600 is positioned adjacent to the left housing section 502, and a second support bearing 610 is positioned adjacent to the right housing section 506. Fasteners 620-623 (623 is hidden in cross-sectional view) (generally 620) are inserted through the support bearings 600 and 610 and the housing sections 502 and 506 to a flange 630 to secure these components together. Connectors and caps that are similar to the housing 500 connectors and caps can be installed on an auxiliary bearing to accommodate electrical connections to sensors. Further, as will be later described with references to FIG. 8A-E, the o-rings 641 and 642 can have a shape of a cylindrical enclosure or can.

As shown in FIGS. 6A-B, fasteners are inserted through the stator 200, for example, through gaps between two solenoids 210. More specifically, the auxiliary bearings 600 and 610 on each side of the stator 200 and the stator housing 500 are secured together with fasteners 620 that extend through the stator housing 500. To prevent moisture from penetrating the stator housing 500, the fasteners 620 may pass through tubes 625 that are welded to the stator housing 500. This arrangement allows for a compact design, and the fasteners 620 tide the auxiliary bearings 600 and 610 and the housing 500 to the connecting flange 630 installed at the end of the scraped-surface heat exchanger. To prevent axial displacement of the assembly, the components may be arranged in a reference-shoulder or nested design between mating parts, e.g., between the connecting flange 630 and the first auxiliary bearing 600, between the first auxiliary bearing 600 and the stator housing 500, between the stator housing 500 and the second auxiliary bearing 610, and between the second auxiliary housing 610 and an end cap.

O-rings 640-643 (generally 640) between mating parts prevent leaks from the apparatus. Also, to facilitate easy maintenance, a set of bolts 645 may attach the first auxiliary bearing 600 to the stator housing 500, and another set of bolts 647 may attach the second auxiliary bearing 610 to the stator housing 500. Releasing the fasteners 620 from the connecting flange 630 allows for the entire assembly to be disconnected from the connecting flange 630. Thus, the heat exchanger can be easily disassembled for repairs and maintenance.

When the rotor 300 is inserted into the stator 200 and properly positioned (e.g., FIG. 6B), the second annular member 340 rotates within the inner aperture 240 between the stator solenoids 210. The first and third annular members 330 and 350 (the outer annular members) are supported by the first and second auxiliary support bearings 600 and 610, respectively. With this configuration, the first and third annular members 330 and 350 rest on the auxiliary support bearings 600 and 610 to prevent the rotor 300 from resting on and possibly damaging the solenoids 210 of the stator 300.

Persons of ordinary skill in the art will recognize that various support bearing and rotor configurations can be utilized. For example, one support bearing or a plurality of support bearings can support the rotor when the rotor is at rest. For example, with a single support bearing and a rotor including an end cap, a first annular member proximate the end cap, and a second annular member proximate the first annular member, the first annular member can rest on the support bearing. Alternatively, the second annular member can rest on the support bearing. In a further embodiment with two support bearings and a rotor that includes an end cap, a first annular member proximate the end cap, and a second annular member proximate the first annular member, wherein the second annular member rests on the support bearing, the first and third (or outer) annular members can rest on the two support bearings.

Further, referring to FIG. 6C, the inner surface of a support bearing is generally circular and includes channels 625. The channels 625 are designed to enhance the flow of cleaning agents around the rotor.

Figure 7A:
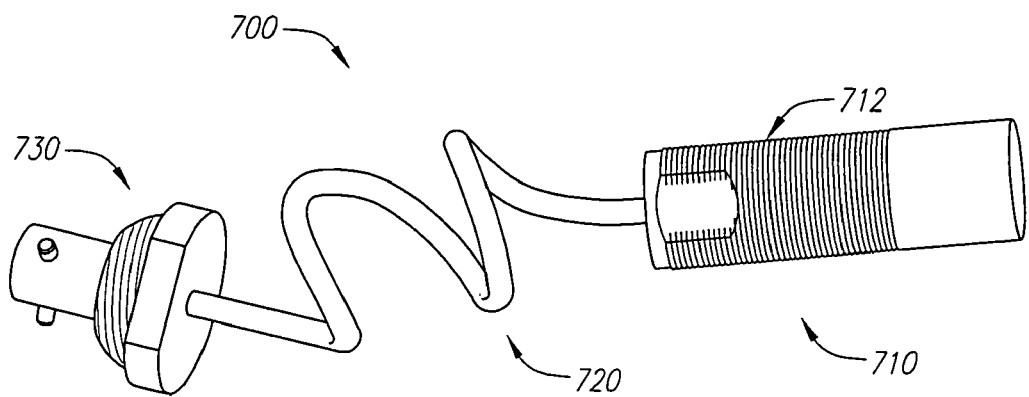
FIG. 7A illustrates a sensor that is inserted through an auxiliary bearing.
Figure 7B:
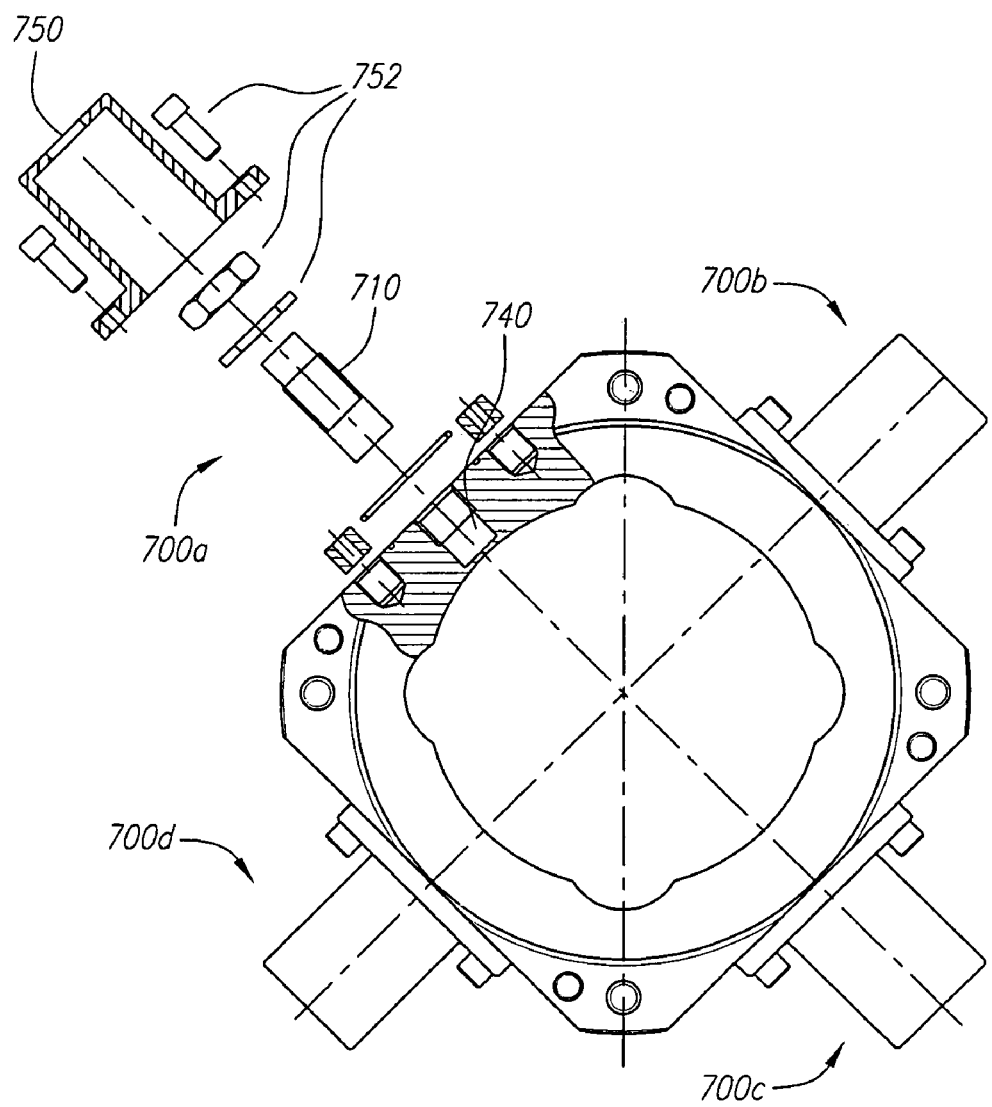
FIG. 7B shows four sensors inserted through an auxiliary bearing.
Figure 8A:
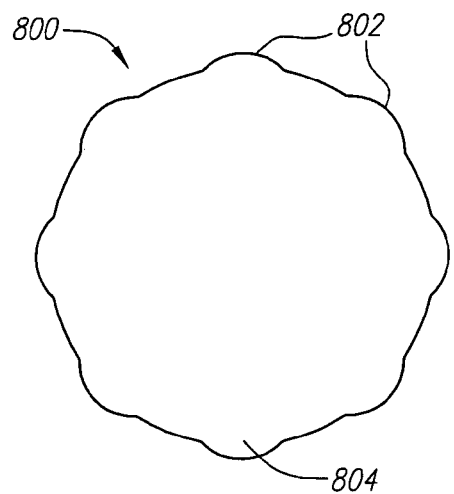
FIGS. 8A-F illustrate various views of a corrugated enclosure or can that is positioned around a rotor.
Figure 8B:
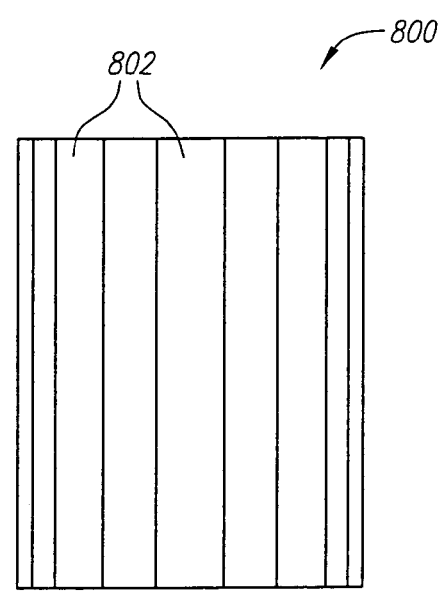
Figure 8C:
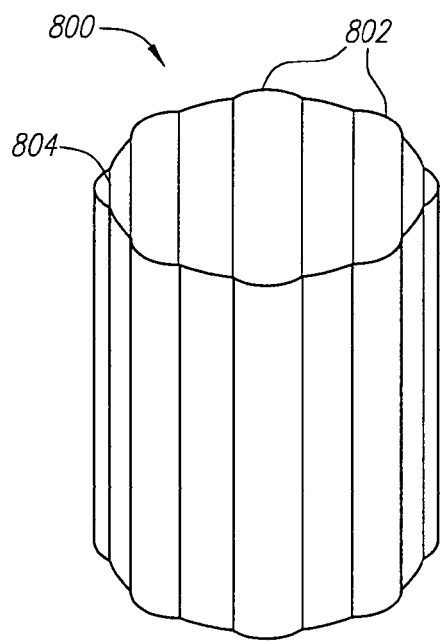
Figure 8D:
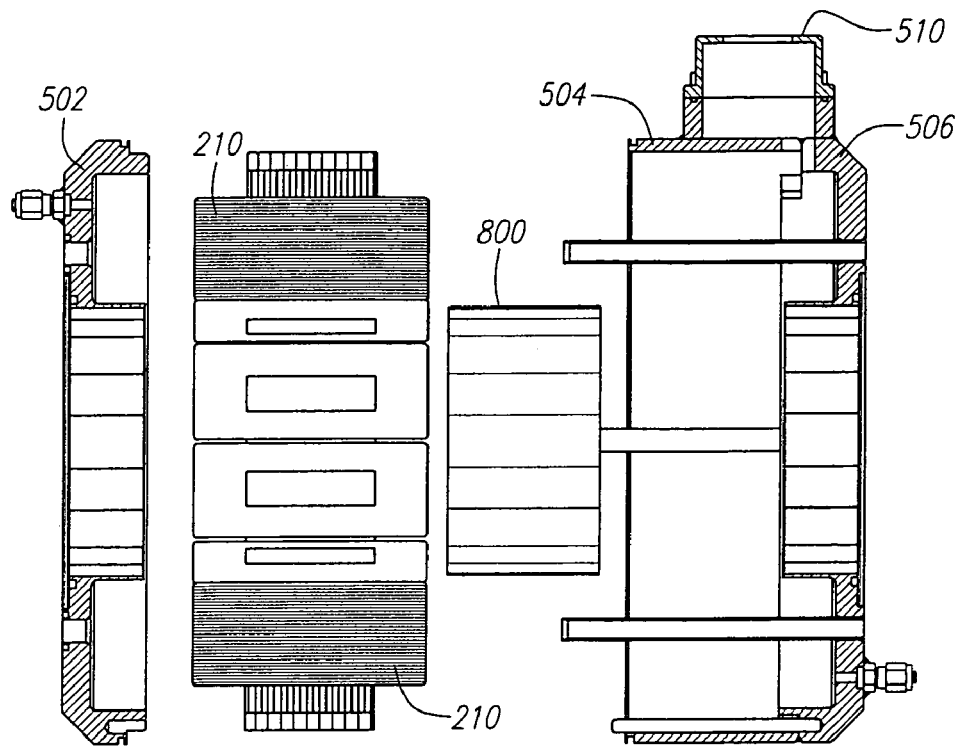
Figure 8E:
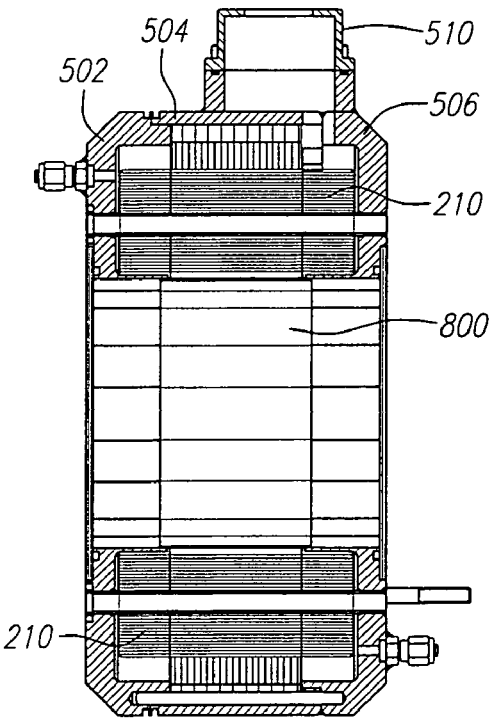
Figure 8F:
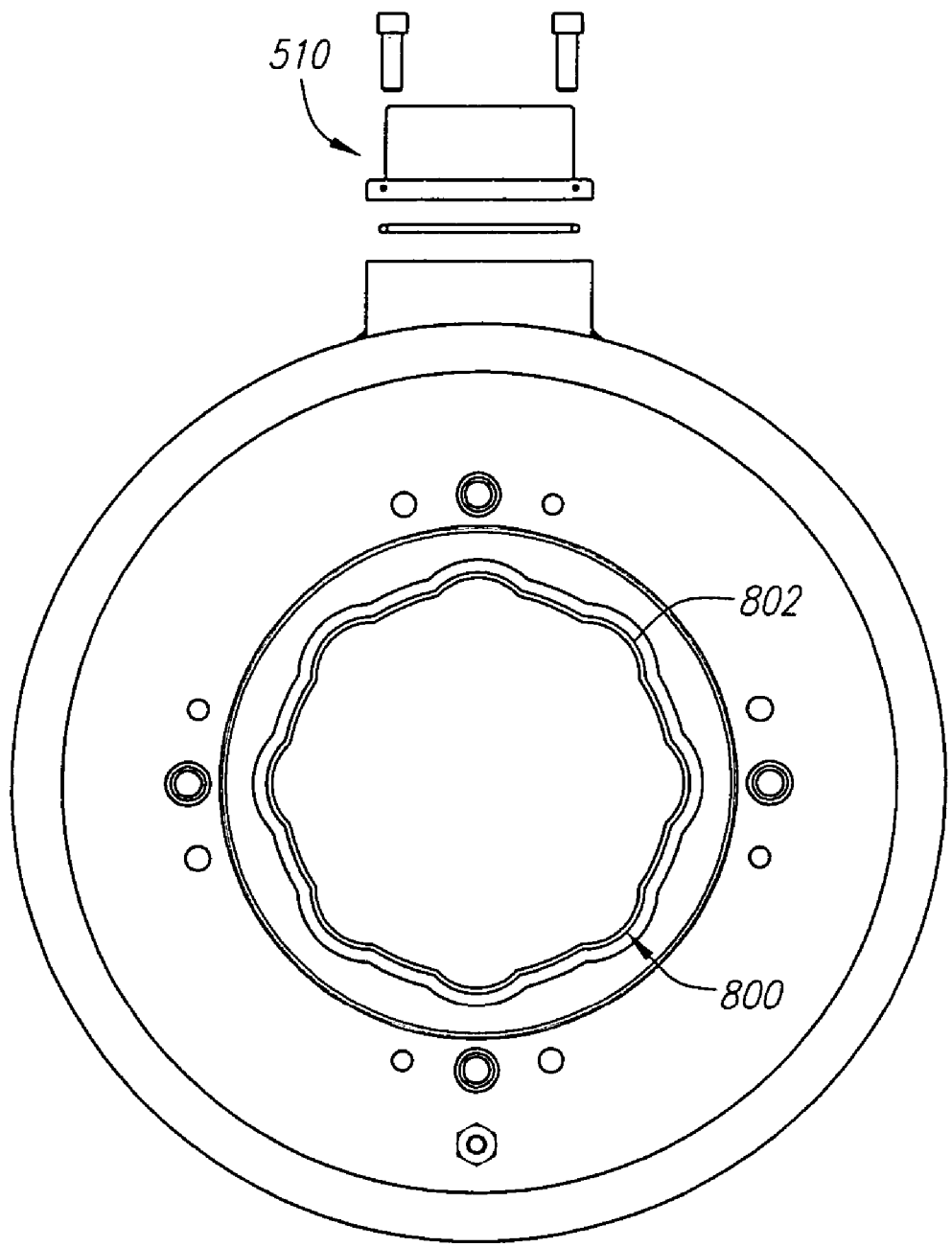

Referring to FIGS. 7A-B, a sensor 700 can be attached to or inserted through one or more auxiliary support bearings. An exemplary sensor 700 includes a sensor element 710, a wire or lead 720, and an adapter or connector 730 that is connected to a control circuit. Other adapters 730 may also be utilized depending on the control circuit that is utilized. The outer surface 712 of the sensor element 710 can be threaded to accommodate various mounting mechanisms.

The sensor 700 can be mounted to or installed within an auxiliary bearing in different ways. For example, referring to FIG. 7B, an aperture 740 is formed through the first auxiliary bearing 600 and the sensor is inserted through the aperture. As shown in FIG. 7B, the sensing end of the sensor element 710 is aligned with the aperture 740 and placed against an outer surface of the first auxiliary bearing 600. A cap 750 is placed over the sensor element 710 and attached to the first auxiliary bearing 600 with fasteners 752. As a result, the sensor is held against or within the first auxiliary bearing 600 within the cap 750, and the sensor element 710 detects the position of the rotor 300 through the aperture 740. In an alternative embodiment, the sensor element 710 can be inserted into the aperture 740.

As shown in FIG. 7B, in one embodiment, the first auxiliary bearing 600 is equipped with four sensors 700a-d orientated at 90 degrees. With this configuration, the sensors 700a-d can detect the horizontal and vertical position of the rotor (and the shaft connected thereto) with four sensor measurements. If necessary, sensors 700 can also be mounted to or inserted through the second auxiliary bearing 610.

Referring to FIGS. 8A-F, a generally cylindrical enclosure or "can" 800 may be placed around the rotor 300 and attached (e.g., welded) within the housing 500 (welded to housing sections 502 and 506). The enclosure 800 is placed around the middle or second annular member 340 of the rotor 300, and the rotor 300 rotates within the enclosure 800. The surface of the enclosure 800 can be, for example, corrugated or have a plurality of raised sections 802 that define indentations or channels 804. The channels 804 of the enclosure 800 provide additional avenues for expelling food product (and cleaning agents if appropriate) from the rotor 300 and into the heat exchanger. The channels 804 extend upward between the plurality of electromagnetic elements when the components are assembled together.

Figure 9A:
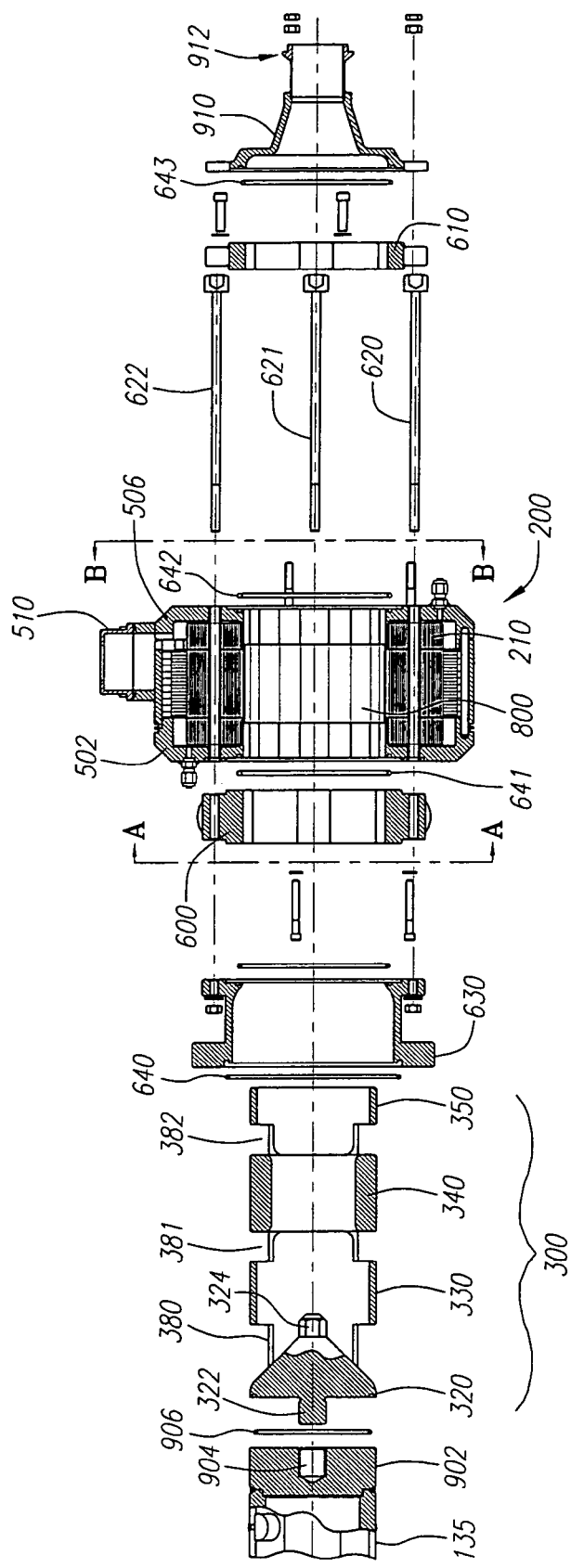
FIG. 9A is a separated, cross-sectional view of a non-drive end.
Figure 9B:
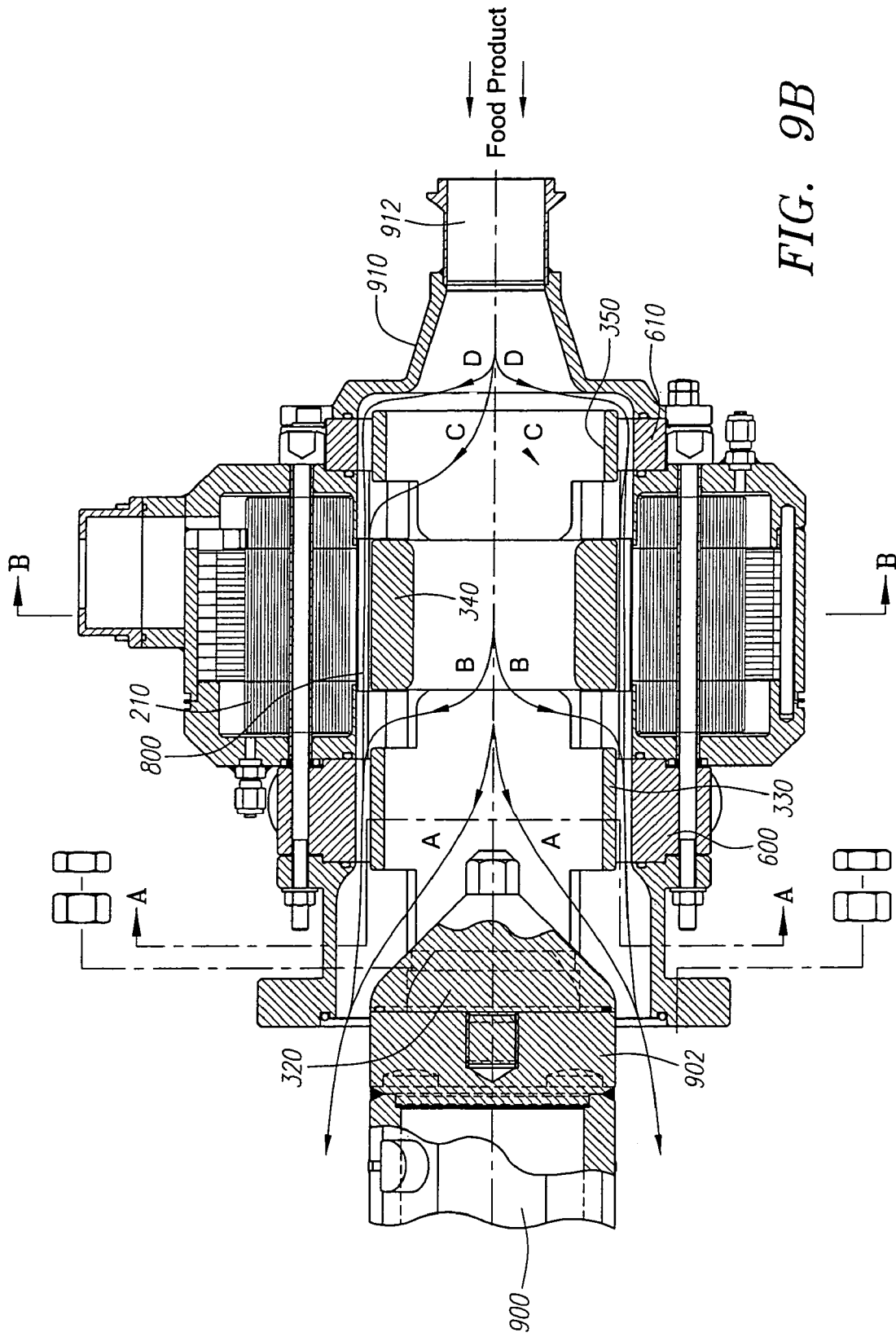
FIG. 9B is a partial, general perspective view of an apparatus.
Figure 9C:
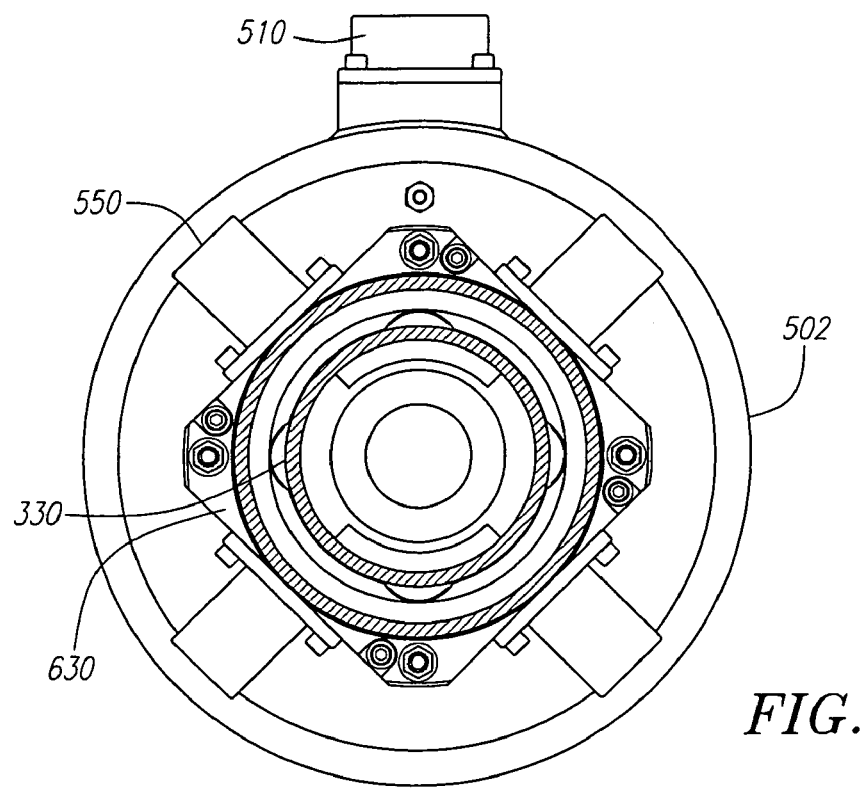
FIG. 9C is a cross-sectional view along lines A-A.
Figure 9D:
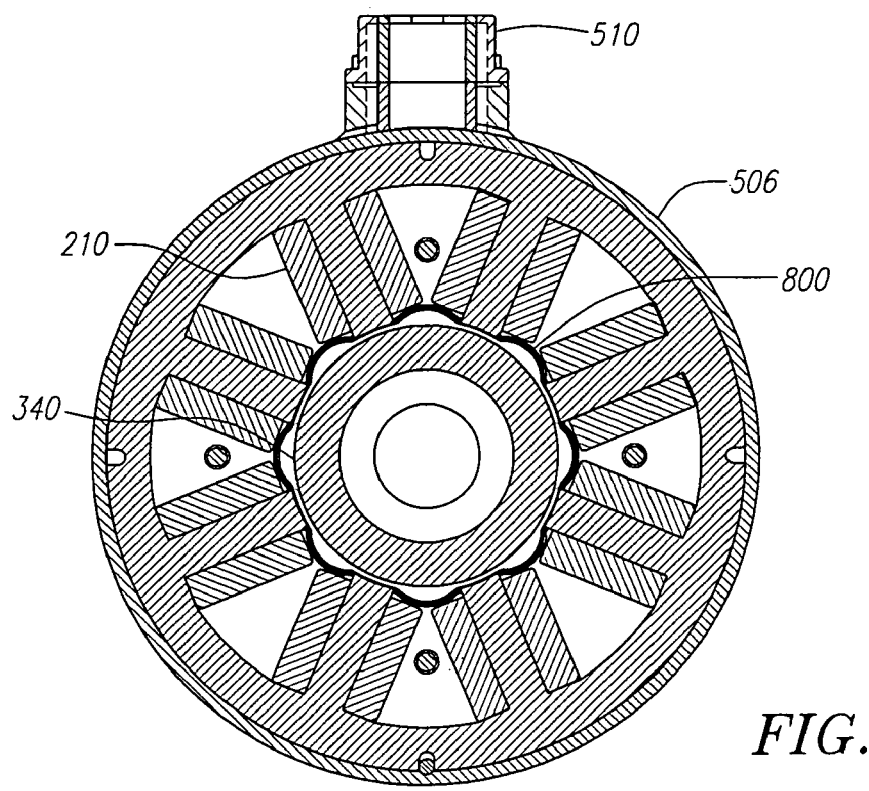
FIG. 9D is a cross sectional view along lines B-B.

FIG. 9A shows how the previously described unassembled components and other additional components are to be assembled. FIGS. 9B-D show different views of the previously described apparatus components connected and assembled. The shaft 135 may include an adapter 902 (if necessary) to couple to the rotor. An exemplary adapter 902 includes a receiving or coupling aperture 904, and the mounting end 322 of the conical end member 320 is secured within the aperture 904 of the adapter 902. An o-ring or gasket 906 provides a seal there between. The shaft 135 extends into the heat exchanger cylinder and includes scraper blades that scrape the inner surface of the heat exchanger.

The housing sections 502 and 506 and auxiliary bearings 600 and 610 are secured together with fasteners 620-622 to a flange 630. The fasteners 620-622 extend through the first support bearing 600, the first and third housing sections 502 and 506, and the third support bearing 610.

The rotor 300 is installed within the housing 500 and the stator 200 so that the first annular member 330 is generally aligned with the first auxiliary support bearing 600, the second annular member 340 is generally aligned with the solenoids 210 of the rotor 200, and the third annular member 350 is generally aligned with the second auxiliary support bearing 610. As a result, the second annular member 340 rotates within the aperture 240 between the solenoids 210 in the stator 200. The cylindrical enclosure or can 800 is also placed applied around the second annular member 340 so that the rotor 300 rotates within the can 800 and the solenoids 210. The O-rings 641 and 642 around the can 800 may have a shape to match the can 800, e.g., a corrugated shape. An end cap 910 is applied to cover the end of the third annular member 350. A food product inlet 912 is provided at an end of the end cap 910.

In use, food product is provided to the inlet 912, through the end cap 910, and into the inner cavity 370 of the rotor 300 through the third annular member 350. As the rotor 300 rotates within the stator 200, the food product exits the rotor 300 through one or more apertures. For example, as shown in FIG. 9B, food product can exit through any of the three apertures 380-382. In one embodiment, a majority of the food product exits along path A through aperture 380.

With regard to using a corrugated can 800, food product can flow along the channels or indentations 804 formed by the corrugated sections 802. The food product then exits the rotor 300.

While the rotor 300 is rotating, the one or more sensors 700 within one or more auxiliary support bearings 600 and 610 detect the radial position of the rotor 300. The sensor detection can be, for example, every 1/10,000 second. The sensor data is sent to the control circuit 520. The control circuit compares the sensor data with data corresponding to an acceptable position or predetermined range of positions of the rotor 300. If the sensor 700 data indicates that the rotor 300 is in an acceptable position or range, then the control circuit can maintain the current state of the solenoids 210, or de-activate or activate one or more solenoids 210 to maintain the rotor 300 within the acceptable position. This may involve maintaining the current solenoid stators or activating or de-activating one or more solenoids. If the sensor 700 data indicates that the rotor 300 should be re-aligned or adjusted, then one or more solenoids 210 or one or more pairs of solenoids 210 can be activated or de-activated to implement the adjustment and dynamically align the rotor.

For example, a pair of solenoids 210 can be activated to attract or repel the rotor, as previously discussed, to move the rotor 310 into alignment. These adjustments can occur periodically or intermittently at non-periodic times, as needed. The alignment of the rotor can be maintained with varying degrees of accuracy, e.g., within +−20 micrometers.

Figure 10:
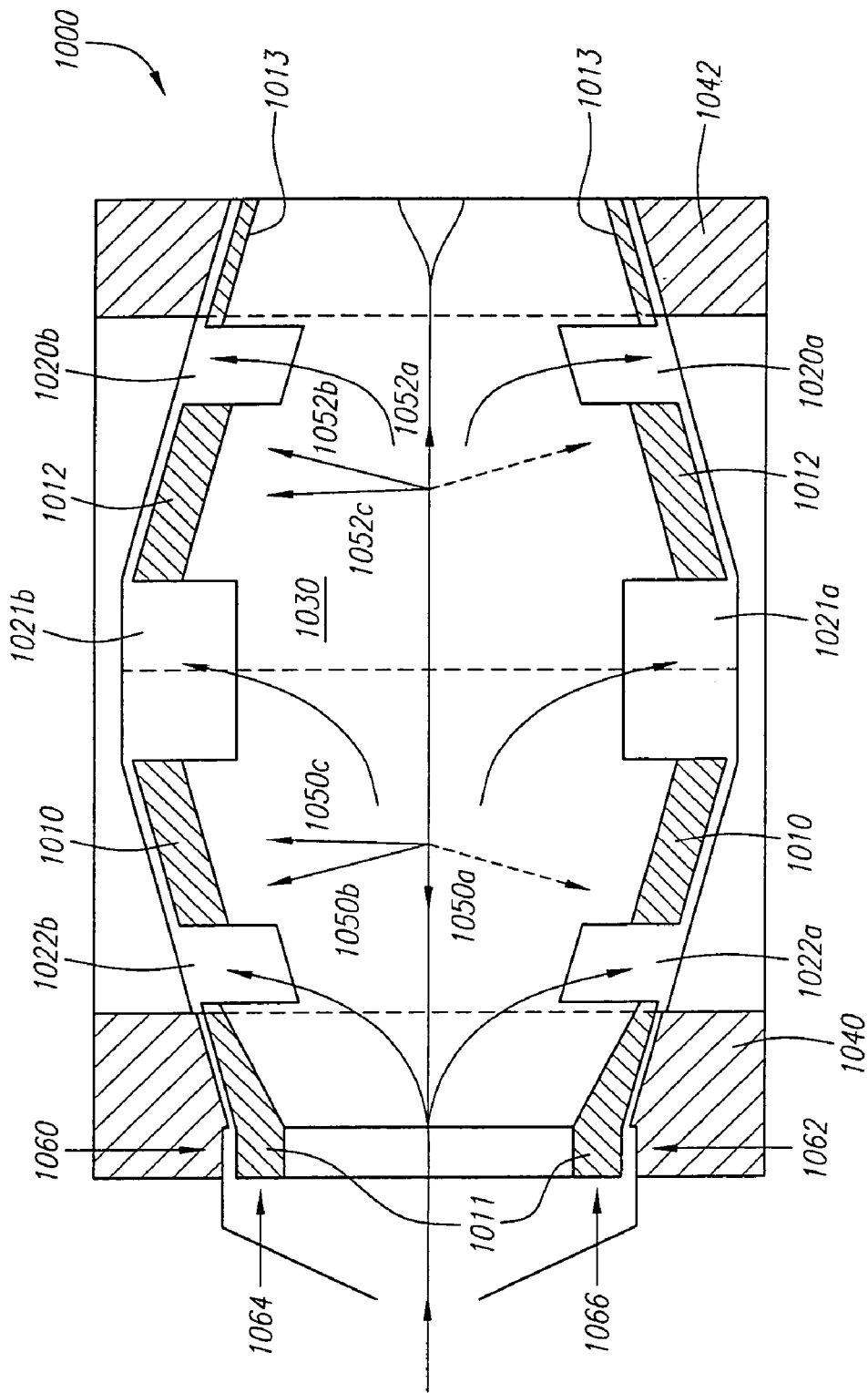
FIG. 10 is a cross-sectional view of an alternative rotor of a non-drive end having a conical configuration.

The previously described alignment techniques can also be applied to different rotor configurations, such as arcuate and conical sections. For example, referring to FIG. 10, in an alternative embodiment, the rotor 1000 can have a conical shape, such as a double or inverted conical shape formed by four sections 1010-1014. In this embodiment, the stator also has a conical shape corresponding to the conical rotor. The sections 1010-1014 define apertures 1020a and 1020b, 1021a and 1021b, and 1022a and 1022b and a conical or angled conical cavity 1030 through which a food item can flow (e.g., as shown by arrows). Auxiliary bearings 1040 and 1042 provide support to the rotor sections 1011 and 1013 when, for example, the rotor is at rest or not rotating, similar to the previously described rotor auxiliary bearing configuration.

The conical-shaped rotor 1000 may provide both dynamic radial alignment and dynamic axial alignment with magnetic bearings. In other words, the conical rotor provides a combination of radial and axial support, as illustrated by the force arrows 1050a-c and 1052a-c. Specifically, radial alignment forces are identified by the vertical forces 1050c and 1052c. Axial alignment forces are represented by opposite arrows 1050a and 1052a. The combination of the radial and axial forces is represented by force arrows 1050b and 1052b.

More specifically, position sensors 1060 and 1062 detect the radial position of the conical rotor. If the radial position of the rotor needs to be adjusted, one or more stator solenoids can be periodically or intermittently activated to attract or repel the rotor and alter the radial position of the rotor, as previously discussed. Similarly, position sensors 1064 and 1066 detect the axial position of the rotor. If the axial position of the rotor needs to be adjusted, one or more solenoids can be periodically or intermittently activated to attract or repel the rotor and provide axial forces. Since the axial forces are in opposite directions due to the conical configuration, however, the axial forces tend to maintain the rotor in narrow range of positions.

Having described embodiments using magnetic bearings in the non-drive end and various non-drive end rotor configurations, following is a description of methods for magnetically aligning a drive end and a drive end of a scraped-surface heat exchanger and processing a food product.

Figure 11:
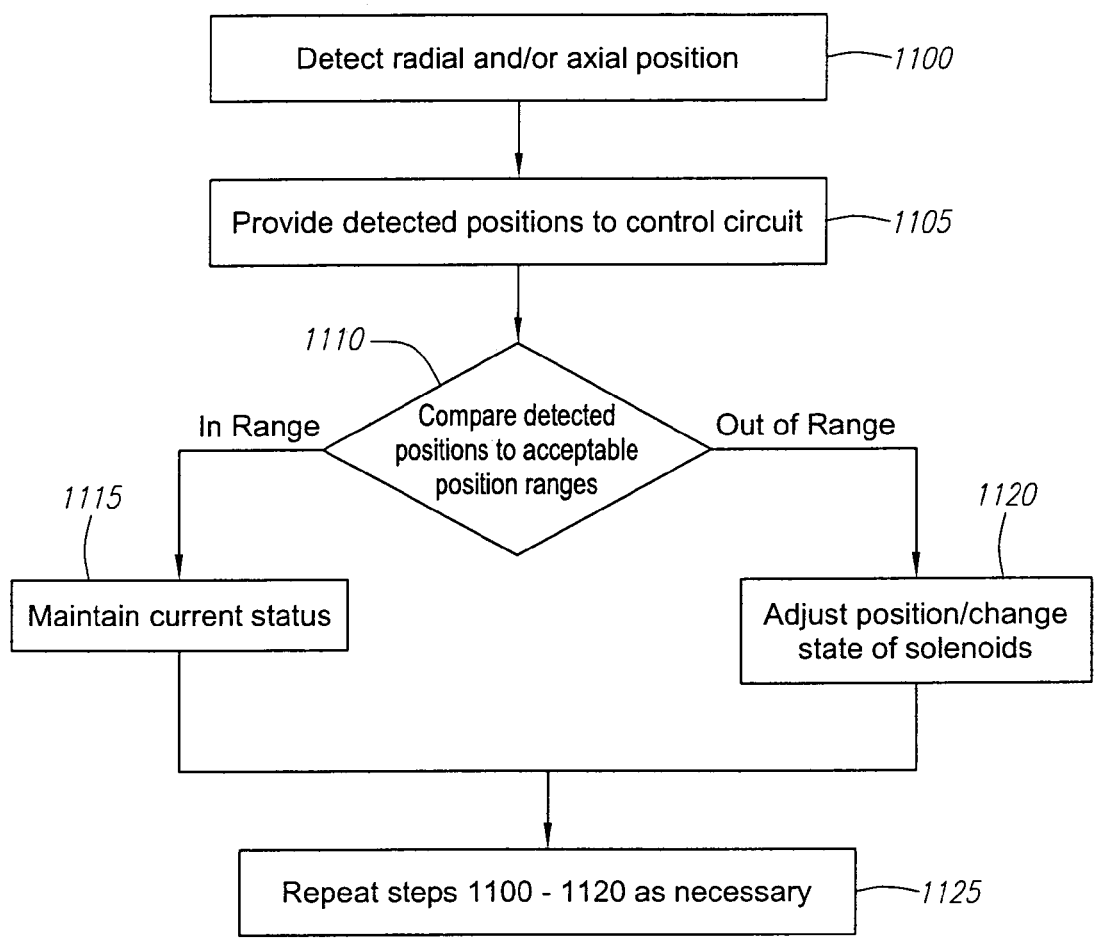
FIG. 11 is a flow diagram illustrating dynamic alignment using magnetic bearings.

Referring to FIG. 11, initially, in step 1100, one or more sensors detect a first radial or vertical position of a rotor (and a first axial or horizontal position of the rotor if applicable). In step 1105, the detected positions are provided to a control circuit or processor. In step 1110., the control circuit compares the detected positions or alignments with acceptable positions or predetermined range of acceptable positions. In step 1115, if the detected positions are acceptable, then the current status of the positions may be maintained. Maintaining the current position status can be, for example, maintaining inactive solenoids, maintaining active solenoids, or activating or de-activating one or more solenoids so long as the rotor remains in the accepted ranges.

In step 1120, if the rotor positions fall outside of the acceptable ranges, then the state of the solenoids can be changed to adjust the rotor alignment. For example, one or more solenoids can be activated to repel or attract the rotor into an acceptable radial position, if necessary. Similarly, one or more solenoids can be activated to repel or attract the rotor into an acceptable axial position, if necessary. As previously discussed, different numbers and patterns of solenoids can be activated at different times and for different durations to provide the necessary adjustments.

In step 1125, steps 1100-1120 are repeated as necessary. As a result, the drive end, non-drive end, and shaft there between are monitored and aligned in radial and/or axial directions using magnetic bearings, and the scraping mechanism can operate more effectively since it is maintained in proper alignment.

Having described embodiments of the non-drive end 110, this specification now describes embodiments of a drive end 120 in further detail. The position of the drive end 120, like the non-drive end 110, can also be monitored and aligned using magnetic bearings. Accordingly, the previous description of magnetic alignment component and methods for the non-drive end are not repeated provided since the same components and principles apply to the drive end.

Figure 12:
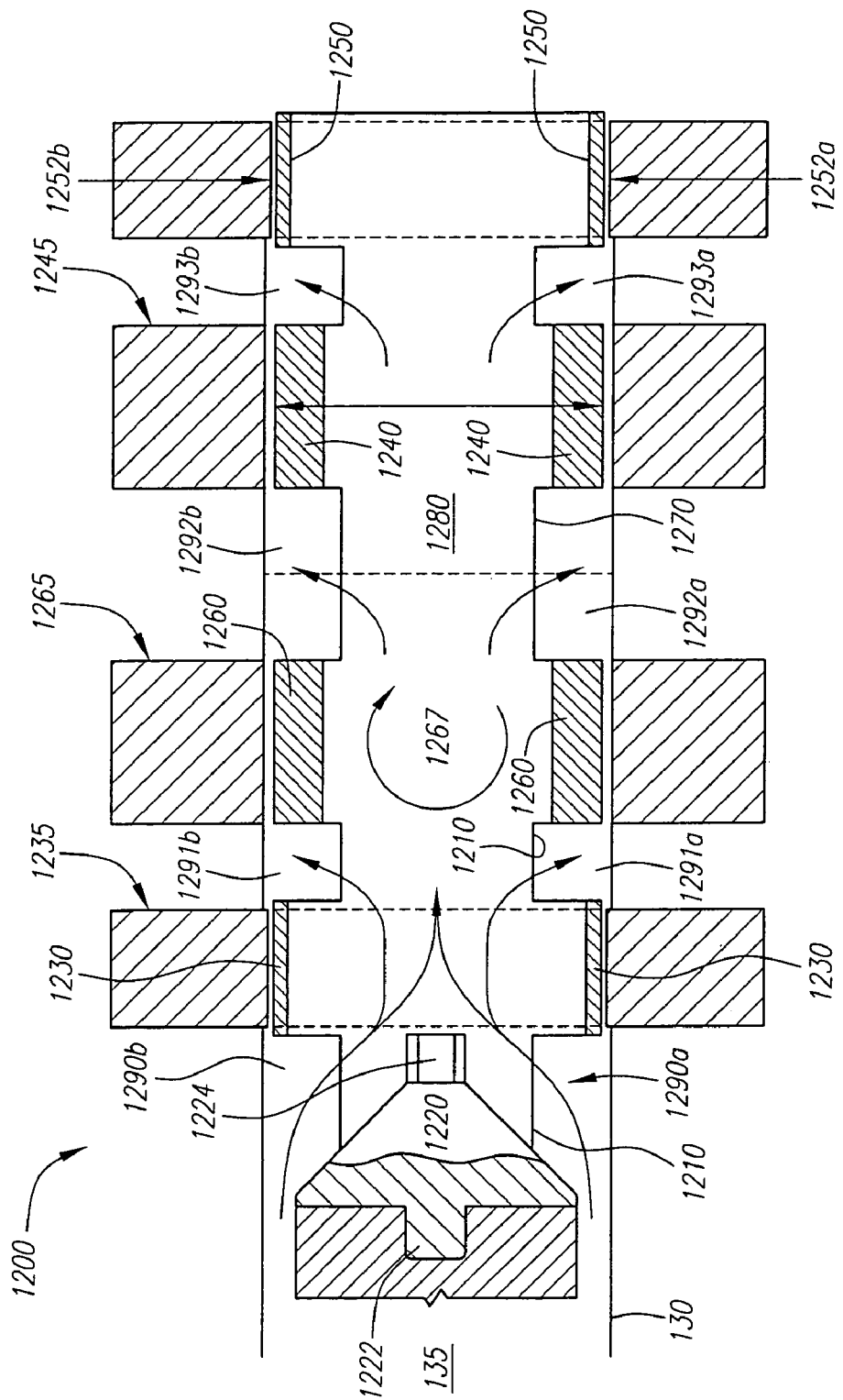
FIG. 12 is a cross sectional view of a drive or motor end.

Referring to FIG. 12, the opposite end of the shaft 135 is coupled to a drive end rotor 1200. A mounting end 1222 of the conical end member 1220 of the rotor is secured to the shaft 135 or a shaft connector.

The drive end rotor 1200 is similar to the non-drive end rotor except that the drive end rotor also accommodates a canned or brushless motor 1265. Specifically, the drive end rotor 1200 is a generally cylindrical body 1210 having a generally conical end member 1220. The cylindrical body 1210 includes a first annular member 1230 proximate or adjacent to the conical end member 1220, a second annular member 1240 that is driven by the canned motor 1265, a third annular member 1250 proximate or adjacent to the second annular member 340, and a motor or drive member 1260.

The conical end member 1220 and the annular members are joined together by one or more lateral segments 1270 that extend across the rotor 1200. The cylindrical body 1210 also defines a generally cylindrical inner cavity 1280 that extends through the annular members to the end cap 1220 through which food product can flow. The rotor 300 also defines one or more arcuate apertures through one or more sections of the rotor through which a food product can also flow (e.g., as shown by flow arrows). For example, arcuate apertures 1290a and 1290b (generally 1290) are formed between the conical end member 1220 and the first annular member 1230, arcuate apertures 1291a and 1291b (generally 1291) are formed between the first annular members 1230 and the motor member 1260, arcuate apertures 1292a and 1292b (generally 1292) are formed between the motor and second annular members 1260 and 1240, and apertures 1293a and 1293b (generally 1293) are formed between the second and third annular members 1240 and 1250. As in the non-drive end, different numbers of apertures can extend for different circumferential distances around the cylindrical drive end rotor depending on the rotor configuration and desired food product throughput. For example, one, two, three, or other numbers of apertures can be utilized. For purposes of explanation and illustration, but not limitation, this specification refers to four arcuate apertures 1290-1293. Further, similar to the non-drive end rotor, different annular members of the drive-end rotor 1200 can have different diameters, widths, and thicknesses.

The motor 1265, such as a canned motor, is activated in a known circular manner to provide a torque 1267 to the annular member 1260, thereby rotating the rotor 1200, the shaft 135 connected to the rotor 1200, and the non-drive end rotor 300 connected to the opposite end of the shaft 135.

A stator 1245 (similar to the stator 200) is provided to provide radial alignment with magnetic bearings through annular member 1240. The dynamic alignment is conducted in a manner that is similar to the previously described alignment techniques. For example, individual or pairs of solenoids can be activated periodically or intermittently to impart a radial force to the rotor and dynamically align the rotor.

An auxiliary bearing 1255 provides support to the rotor 1200, specifically, to the annular member 1250, when the drive end rotor is at rest. Position sensors 1252a and 1252b (generally 1252) detect the radial position rotor. The sensor 1252 data is provided to a controller (not shown), which can activate or de-activate one or more solenoids to adjust the rotor position as necessary. A second auxiliary bearing 1235 can also be utilized, if necessary, to provide further support to the drive end rotor 1200.

In use, a food product travels over the shaft 135 and the conical end member 1220, and into the rotor 1200 via apertures 1290. While the rotor 1200 is driven by the canned motor 1265, the food product exits the rotor 1200 through one or more of the apertures 1291, 1292, and 1293. In one embodiment, a majority of the food product exits the rotor 1200 through the middle cavity or aperture. As shown in the figures, the flow of food product is from the non-drive end to the drive end. The flow may also be reversed from the drive end to the non-drive end.

Referring to FIGS. 13A-D, in an alternative embodiment, an end of the non-drive end rotor 1300 may be modified, and an axial load support member 1310 can be coupled to the modified end 1305 of the rotor 300. The rotor includes a conical end member 320, and annular members 330 and 340, similar to the rotor 300 shown in FIG. 9A. The axial support member includes a fixed outer support 1330, a rotatable inner member 1340 that is attached to the end of the rotor, and a rotatable cage 1320 between the fixed outer support and the rotatable inner member. The cage defines housings 1355 that hold a plurality of bearings 1350.

The fixed outer support member 1310 serves as a substitute for the auxiliary bearing member 610, and the rotatable inner member 1330 serves as a substitute for the annular member 350 of the non-drive end rotor 300 to provide both radial and axial support. The radial support can be provided magnetically (as previously discussed), and the axial support can be provided mechanically, e.g., with bearings, as discussed below.

Figure 13A:
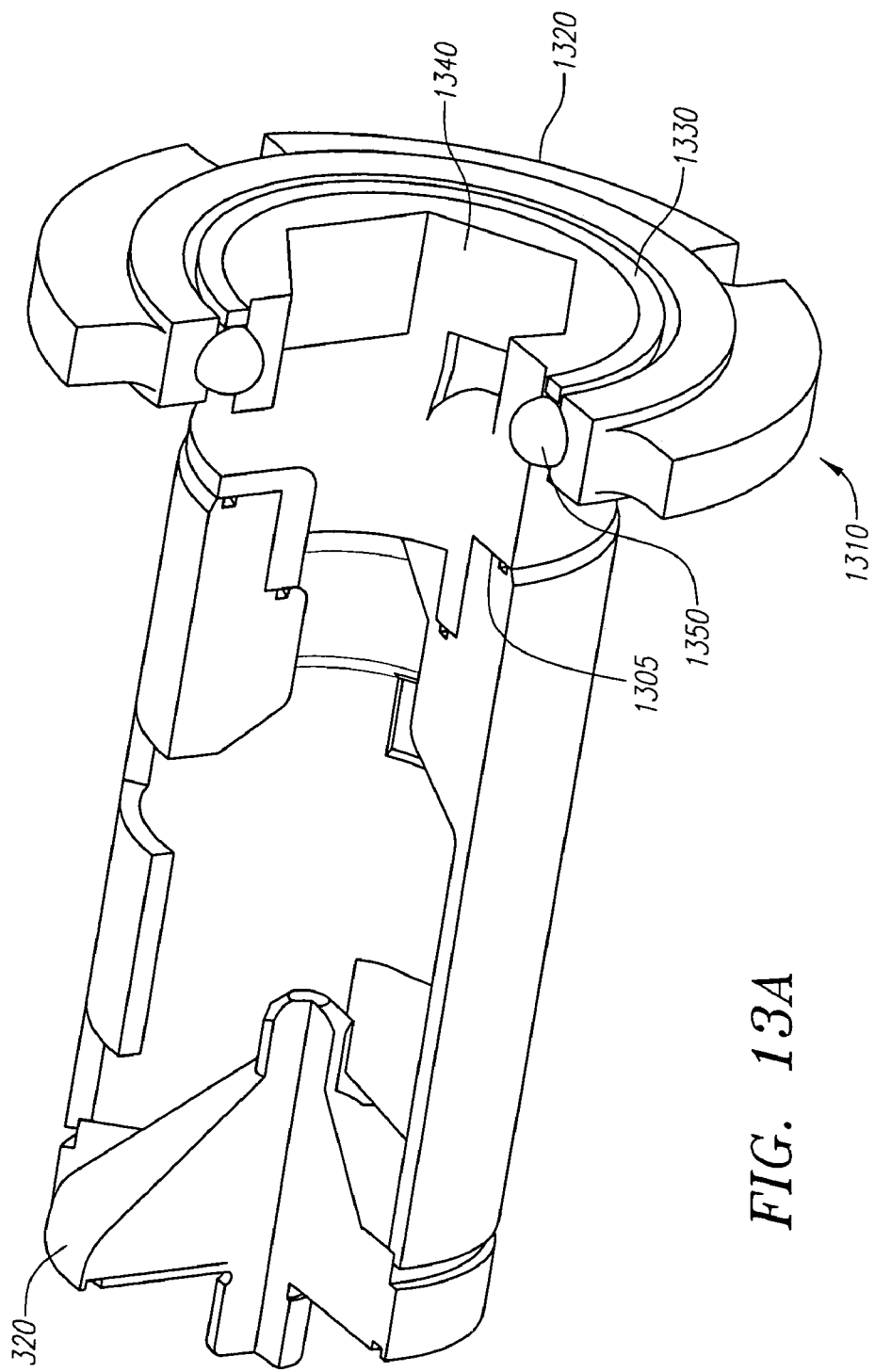
FIG. 13A-B are partial perspective views of an axial support member.
Figure 13B:
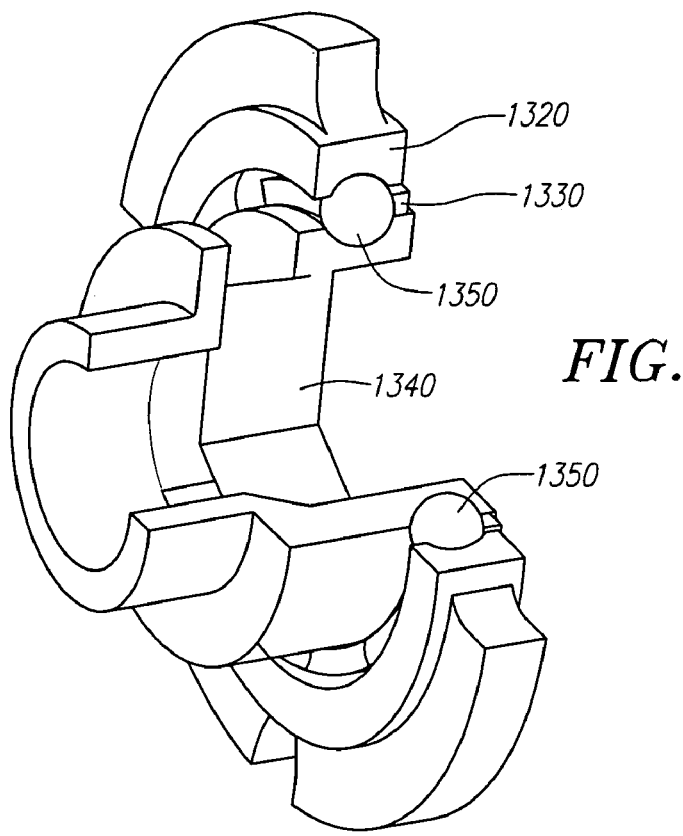
Figure 13C:
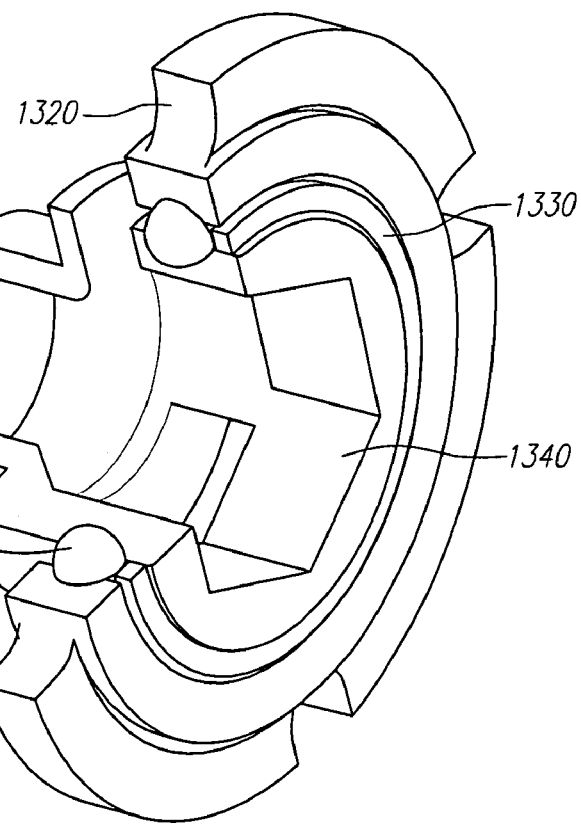
FIG. 13C is a partial perspective view of an axial support member coupled to a rotor.
Figure 13D:
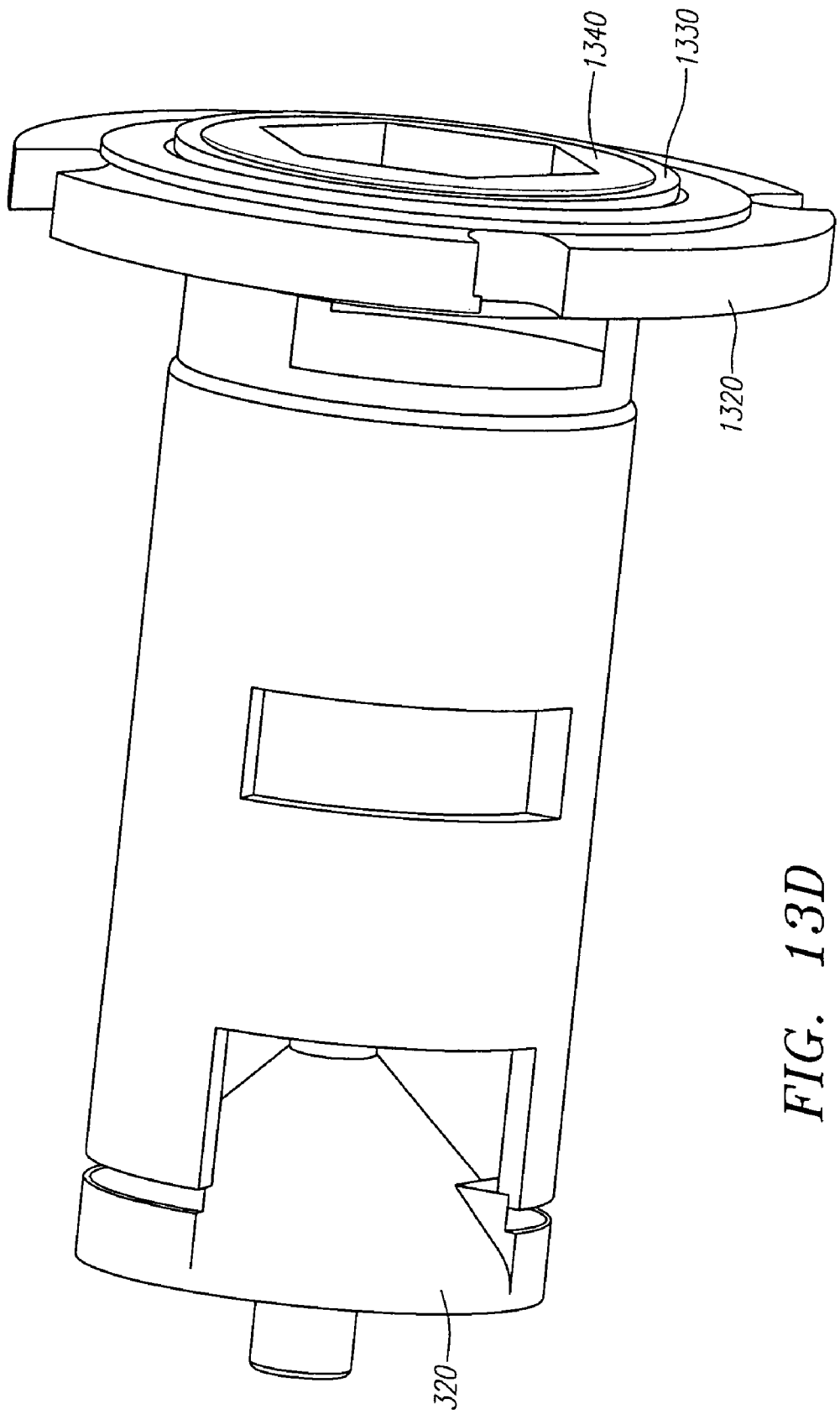
FIG. 13D is a perspective view of the axial support member coupled to a rotor.

FIGS. 13A-C are cut-away perspective views that illustrate bearings 1340. The play or movement in the bearings within their housings can determine the degree of radial-axial adjustment. For example, if the bearings are tightly packed in the housings, then minimal radial-axial play is provided. Accordingly, such a configuration may be a substitute for the conical rotor configuration shown in FIG. 10, which provides both radial and axial support. If the bearings are loosely radially fitted in their housings, then axial adjustment may be provided.

The rotor configuration shown in FIGS. 13A-D also allows for dynamic radial alignment using magnetic bearings as previously discussed. For example, the rotor section 340 can rotate within a stator (not shown). One or more solenoids of the stator can be periodically or intermittently activated to radially adjust the position of the rotor.

In use, when the rotor rotates, the inner support member and the cage also rotate. The food product flows through the inner cavity 1345 defined by the inner member 1340. Food product can also flow between the bearings and over and under the cage member.

The previously described configurations and methods are advantageous over conventional systems since they allow for dynamically alignment of the rotor and the heat exchanger shaft attached thereto, provide increasing processing efficiencies, reduce and simplify maintenance and cleaning of surfaces that contact the food product, reduce food product processing times, and reduce equipment costs. The alignments can be in radial and/or axial directions. Further, embodiments of the invention provide for one or both of the non-drive end and the drive end being free of mechanical seals and the problems and maintenance typically associated with mechanical seals.

Persons of ordinary skill in the art will recognize that the embodiments can be modified in various ways to perform the same alignment and food product processing functions. For example, other electromagnetic members besides solenoids can be utilized. Further, one or more or various combinations of solenoids can be activated or deactivated to repel or attract a temporarily or permanently magnetized rotor for radial and/or axial alignment. Further, the rotor can be made of various materials that can be magnetized, such as stainless steel, various ferro-magnetic materials, and other magnetic materials. Further, the sensor can detect rotor alignment and position data at various time intervals, and the rotor position can be adjusted at various times. Moreover, the rotor can be configured with various numbers and sizes of apertures for different food processing applications and processing capabilities. Various other auxiliary support members and enclosures can be utilized as needed. Additionally, a scraped-surface heat exchanger can be equipped with various configurations that include embodiments of the present invention.

Accordingly, the embodiments provide effective, flexible and efficient manners of dynamically aligning a rotor and heat exchanger shaft, while improving food processing techniques and food products that are processed with heat exchangers.

Additionally, the embodiments can be applied to process food items and other non-food items, e.g., for use in chemical, pharmaceutical, and power industries and applications.

What is claimed:

1. A magnetic alignment apparatus for aligning a shaft of a scraped-surface heat exchanger, comprising:
    a stator having a plurality of electromagnetic elements;
    a rotor attached to a shaft, the rotor rotating within the stator, defining an inner cavity through which food product flows, and comprising,
        an end member,
        a first annular member proximate the end member, and
        a second annular member proximate the first annular member,
        wherein the inner cavity extends through the first and second annular members;
    a sensor for detecting a position of the rotor; and
    a control circuit in communication with the sensor and the electromagnetic elements, wherein the control circuit monitors the position of the rotor with data from the sensor and changes a state of one or more electromagnetic elements to adjust the rotor position.

2. The apparatus of claim 1, wherein the stator includes eight electromagnetic elements.

3. The apparatus of claim 1, wherein the stator includes a pair of electromagnetic elements.

4. The apparatus of claim 3, wherein the pair includes two adjacent electromagnetic elements.

5. The apparatus of claim 1, wherein the pair includes two nonadjacent electromagnetic elements.

6. The apparatus of claim 1, wherein the state of the one or more electromagnetic elements is changed periodically.

7. The apparatus of claim 1, wherein the state of the one or more electromagnetic elements is changed non-periodically.

8. The apparatus of claim 1, wherein the plurality of electromagnetic elements comprises a plurality of solenoids.

9. The apparatus of claim 1, wherein the stator has a generally cylindrical shape.

10. The apparatus of claim 1, wherein the stator has a conical shape.

11. The apparatus of claim 1, wherein an outer surface of the rotor can be magnetized with different polarities.

12. The apparatus of claim 1, wherein the rotor comprises a magnetizable stainless steel rotor.

13. The apparatus of claim 1, wherein the rotor can be permanently magnetized.

14. The system of claim 1, wherein the rotor can be temporarily magnetized.

15. The apparatus of claim 1, wherein a food product exits the rotor though an aperture defined between the end member and the first annular member.

16. The apparatus of claim 1, wherein the food product exits the rotor through an aperture defined between the first and second annular members.

17. The apparatus of claim 1, further comprising a third annular member proximate the second annular member.

18. The apparatus of claim 17, wherein the food product exits the rotor through an aperture defined between the second and third annular members.

19. The apparatus of claim 1, the end member comprising a conical end member.

20. The apparatus of claim 1, wherein the rotor is generally cylindrical.

21. The apparatus of claim 1, wherein the rotor has a conical shape.

22. The apparatus of claim 1, wherein the rotor is radially adjusted.

23. The apparatus of claim 1, wherein the rotor is axially adjusted.

24. The apparatus of claim 1, wherein the rotor is temporarily magnetized, and electromagnetic members and the rotor are attracted to each other to adjust the rotor position.

25. The apparatus of claim 1, wherein the rotor is permanently magnetized, and electromagnetic members and the rotor are attracted to each other or repelled by each other to adjust the rotor position.

26. The apparatus of claim 1, wherein the rotor position is maintained within a range of about +1 micrometer.

27. The apparatus of claim 1, wherein the shaft is connected between non-drive and drive ends of the heat exchanger, and wherein the position of the non-drive end is adjusted.

28. The apparatus of claim 1, wherein the shaft is connected between non-drive and drive ends of the heat exchanger, and wherein the position of the drive end is adjusted.

29. The apparatus of claim 1, further comprising an axial support member, the axial support member being attached to an end of the rotor.

30. The apparatus of claim 29, wherein the axial support member is attached to a non-drive end of the heat exchanger.

31. The apparatus of claim 29, wherein the axial support member includes a fixed outer support,
    a rotatable inner member that is attached to the end of the rotor, and
    a rotatable cage between the fixed outer support and the rotatable inner member.

32. The apparatus of claim 31, wherein the rotatable cage defines a plurality of housings, wherein each housing holds a bearing.

33. The apparatus of claim 29, wherein the rotor can be magnetically radially aligned.

34. The apparatus of claim 1, wherein the heat exchanger includes a non-drive end and a drive end, the shaft being connected between the non-drive and drive ends, further comprising a motor to drive the shaft.

35. The apparatus of claim 34, the motor comprising a brushless motor.

36. The apparatus of claim 1, wherein the plurality of electromagnetic elements comprises a plurality of solenoids and wherein one or more of the plurality of solenoids are activated to adjust the position of the rotor.

37. The apparatus of claim 1, wherein the plurality of electromagnetic elements comprises a plurality of solenoids and wherein one or more of the plurality of solenoids are de-activated to adjust the position of the rotor.

38. A magnetic alignment apparatus for a scraped-surface heat exchanger, comprising:
    a stator having a plurality of solenoids;
    a rotor that rotates between the solenoids, the rotor defining an inner cavity through which a food product flows and having an outer surface that can be magnetized, wherein a state of one or more solenoids is changed to dynamically align the rotor using a magnetic field through the stator and the rotor; and
    a corrugated member surrounding the rotor, wherein the food product passes between an inner surface of the corrugated member and an outer surface of the rotor.

39. The apparatus of claim 38, further comprising a support bearing, wherein a stationary rotor rests on the support bearing.

40. The apparatus of claim 39, further comprising a sensor tat detects a position of the rotor through the support bearing.

41. The apparatus of claim 38, wherein the outer surface of the rotor is temporarily magnetized.

42. The apparatus of claim 38, wherein the rotor has a conical shape.

43. The apparatus of claim 38, wherein a non-drive end of the heat exchanger is adjusted.

44. The apparatus of claim 38, wherein a drive end of the heat exchanger is adjusted.

45. A method of magnetically aligning a shaft of a scraped-surface heat exchanger, comprising:
   detecting a position of a rotor, the rotor being attached to a shaft, the rotor rotating within a stator;
   comparing a detected position of the rotor to a predetermined range of positions; if the detected position falls outside the predetermined range,
   adjusting the position of the rotor by changing a state of one or more solenoids in the stator so that a magnetic field though the solenoids and the rotor changes the position of the rotor; and
   expelling the food product through an aperture defined between a top surface of the rotor and an interior surface of a corrugated enclosure surrounding a portion of the rotor.

46. The method of claim 45, wherein the rotor is temporarily magnetized, and adjusting the position of the rotor further comprises attracting the rotor towards the solenoids.

47. The method of claim 45, wherein the rotor is permanently magnetized, and adjusting the position of the rotor further comprises repelling the rotor away from the solenoids.

48. The method of claim 45, wherein the rotor is permanently magnetized, and adjusting the position of the rotor further comprises attracting the rotor towards the solenoids.

49. The method of claim 45, further comprising providing one or more support bearings, wherein the rotor rests on the one or more support bearings when the rotor is at rest.

50. The method of claim 45, wherein adjusting the position further comprises adjusting a radial position.

51. The method of claim 45, wherein adjusting the position further comprises adjusting an axial position.

52. The method of claim 45, wherein the rotor comprises a non-drive end of the heat exchanger.

53. The method of claim 45, wherein the rotor comprises a rotor in a drive end of the heat exchanger.

54. The method of claim 45, wherein adjusting the position of the rotor by changing the state of the one or more solenoids further comprises activating the one or more solenoids.

55. The method of claim 45, wherein adjusting the position of the rotor by changing the state of one or more solenoids further comprises de-activating the one or more solenoids.

56. A method of aligning a shaft of a scraped-surface heat exchanger while processing a food product, comprising:
   providing a food product within a rotor;
   rotating the rotor within a stator using a motor, the rotor being attached to a shaft;
   detecting a position of the rotor;
   comparing the detected position to a predetermined range of positions; and if the detected position does fall outside the predetermined range,
   adjusting the position of the rotor by activating or deactivating one or more solenoids in the stator so that a magnetic field completed through the activated solenoid and the rotor changes the position of the rotor,
   wherein the rotor comprises a generally conical end member, a first annular member proximate the generally conical end member, a second annular member proximate the first annular member, and a third annular member proximate the second annular member, wherein an inner cavity extending through the first, second and third annular members.

57. The method of claim 56, wherein the rotor is temporarily magnetized, and adjusting the position of the rotor further comprises attracting the rotor towards the solenoids.

58. The method of claim 56, further comprising expelling a majority of the food product through an aperture defined between the generally conical end member and the first inner member.

59. The method of claim 56, further comprising expelling a portion of the food product through an aperture defined between the first inner member and the second inner member.

60. The method of claim 56, further comprising expelling a portion of the food product through an aperture defined between the second inner member and the third inner member.

61. The method of claim 56, further comprising removing power from the rotor so that the rotor does not rotate; and
   providing a support upon which the rotor rests.

62. The method claim 56, wherein adjusting the position further comprises adjusting a radial position.

63. The method of claim 56, wherein adjusting the position further comprises adjusting an axial position.

64. The method of claim 56, wherein the rotor comprises a non-drive end rotor.

65. The method of claim 56, wherein the rotor comprises a drive end rotor.

66. A magnetic alignment apparatus for aligning a shaft of a scraped-surface heat exchanger, comprising:
   a stator having a plurality of electromagnetic elements;
   a support bearing;
   a rotor attached to a shaft, the rotor rotating within the stator, defining an inner cavity through which food product flows, and comprising,
      a first annular member proximate the end cap, and
      a second annular member proximate the first annular member,
      wherein the first annular member or the second annular member rests on the support bearing;
   a sensor for detecting a position of the rotor; and
   a control circuit in communication with the sensor and the electromagnetic elements,
   wherein the rotor rests on the support bearing when the rotor is at rest, and
   wherein the control circuit monitors the position of the rotor with data from the sensor and changes a state of one or more electromagnetic elements to adjust the rotor position.

67. The apparatus of claim 66, further comprising a second support bearing, wherein the rotor rests on the first and second support bearings.

68. The apparatus of claim 66, wherein the sensor is inserted into the support bearing.

69. A magnetic alignment apparatus for aligning a shaft of a scraped-surface heat exchanger, comprising:
   a stator having a plurality of electromagnetic elements;
   a rotor attached to a shaft, the rotor rotating within the stator and defining an inner cavity through which food product flows;
   a sensor for detecting a position of the rotor;
   a control circuit in communication with the sensor and the electromagnetic elements; and
   a generally cylindrical member surrounding a portion of the rotor, the cylindrical member is corrugated and defines a plurality of channels, wherein the control circuit monitors the position of the rotor with data from the sensor and changes a state of one or more electromagnetic elements to adjust the rotor position, and wherein the food product passes between an inner surface of the cylindrical member and an exterior surface of the portion of the rotor and flows within the channels.

70. The apparatus of claim 69, wherein the channels extend upward between the plurality of electromagnetic elements.

71. A magnetic alignment apparatus for aligning a shaft of a scraped-surface heat exchanger, comprising:

a stator having a plurality of electromagnetic elements;

a rotor attached to a shaft, the rotor rotating within the stator, defining an inner cavity through which food product flows, and comprising,
  a first annular member,
  a second annular member proximate the first annular member, and
  a third annular member proximate the second annular member;

a sensor for detecting a position of the rotor;

a control circuit in communication with the sensor and the electromagnetic elements; and a generally cylindrical member surrounding a portion of the rotor, the cylindrical member is placed around the second annular member, wherein the food product passes between an inner surface of the cylindrical member and an exterior surface of the portion of the rotor, and wherein the control circuit monitors the position of the rotor with data from the sensor and changes a state of one or more electromagnetic elements to adjust the rotor position.

72. The apparatus of claim 71, wherein the cylindrical member is placed between the stator and the rotor.

73. A magnetic alignment apparatus for a scraped-surface heat exchanger, comprising:

a stator having a plurality of solenoids; and a rotor that rotates between the solenoids, the rotor defining an inner cavity through which a food product flows and having an outer surface that can be magnetized, wherein a state of one or more solenoids is changed to dynamically align the rotor using a magnetic field through the stator, wherein the rotor comprises, a generally conical end member, a first annular member proximate the generally conical end member, a second annular member proximate the first annular member, and a Third annular member proximate the second annular member, and wherein the inner cavity extends though the first, second and third annular members.

* * * * *